US011696352B2

(12) United States Patent
Thangarasa et al.

(10) Patent No.: US 11,696,352 B2
(45) Date of Patent: *Jul. 4, 2023

(54) METHODS FOR LIMITING INTERRUPTION IN MULTICARRIER PROSE OPERATION

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,634

(22) Filed: Jul. 29, 2021

(65) Prior Publication Data
US 2021/0360717 A1 Nov. 18, 2021

Related U.S. Application Data

(63) Continuation of application No. 16/088,373, filed as application No. PCT/EP2017/057341 on Mar. 28, 2017, now Pat. No. 11,089,644.

(60) Provisional application No. 62/317,178, filed on Apr. 1, 2016.

(51) Int. Cl.
*H04W 76/15* (2018.01)
*H04W 76/14* (2018.01)
*H04L 1/1812* (2023.01)
*H04L 12/28* (2006.01)
*H04W 4/02* (2018.01)
*H04W 36/00* (2009.01)

(52) U.S. Cl.
CPC .......... *H04W 76/14* (2018.02); *H04L 1/1812* (2013.01); *H04L 12/2854* (2013.01); *H04W 4/023* (2013.01); *H04W 36/03* (2018.08); *H04W 76/15* (2018.02)

(58) Field of Classification Search
CPC ..... H04W 4/023; H04W 76/15; H04W 36/03; H04W 76/14; H04L 1/1812; H04L 12/2854
See application file for complete search history.

(56) References Cited

U.S. PATENT DOCUMENTS

2015/0373719 A1* 12/2015 Xu .............. H04W 72/042
370/329
2016/0050534 A1* 2/2016 Lim ............. H04W 64/00
370/252
2017/0013630 A1* 1/2017 Franz ............. H04L 5/0098
2017/0099581 A1* 4/2017 Yang ............. H04W 8/005
(Continued)

OTHER PUBLICATIONS

Foreword; 3GPP TS 36.133 v13.2.0, Release 13—Dec. 2015.
(Continued)

*Primary Examiner* — Barry W Taylor
(74) *Attorney, Agent, or Firm* — Baker Botts L.L.P.

(57) ABSTRACT

A method in a network node (115) is disclosed for managing interruptions to Wide Area Network, WAN, operation of a wireless device (110), wherein the wireless device provides Proximity Services, ProSe, over at least two carriers (305, 310). The method comprises determining (804) a configuration of the wireless device for ProSe operation such that an aggregated interruption to the WAN operation of the wireless device is below an allowed interruption value.

30 Claims, 14 Drawing Sheets

(56) References Cited

U.S. PATENT DOCUMENTS

| | | | |
|---|---|---|---|
| 2017/0273110 A1* | 9/2017 | Chen | H04W 72/14 |
| 2018/0206252 A1* | 7/2018 | Thangarasa | H04W 72/54 |
| 2018/0206260 A1* | 7/2018 | Khoryaev | H04W 72/1289 |
| 2018/0279109 A1* | 9/2018 | Huang | H04W 72/1289 |
| 2019/0045345 A1* | 2/2019 | Lee | H04L 5/0048 |
| 2019/0327732 A1 | 10/2019 | Yoon | |
| 2020/0322910 A1 | 10/2020 | Zhang | |
| 2020/0396717 A1 | 12/2020 | Luo | |

OTHER PUBLICATIONS

3GPP TSG-RAN WG4 #72; Dresden, Germany; Source: Qualcomm Incorporated; Title: RRM Requirements for D2D (R4-145189)—Aug. 17-Aug. 22, 2014.

3GPP TSG RAN WG4 Meeting #72bis; Singapore; Source: Ericsson; Title: Requirements for PCell interruption for D2D UE (R4-146427)—Oct. 6-10, 2014.

3GPP TSG-RAN WG4 Meeting #74; Athens, Greece; Source: Intel Corporation; Title: Further discussion on interruption requirements for D2D (R4-150165)—Feb. 9-13, 2015.

3GPP TSG RAN WG4 Meeting #78; Malta; Source: Ericsson; Title: Synchronization overhead for D2D Discovery operation on non-serving carrier (R4-160980)—Feb. 15-19, 2016.

3GPP TSG Ran Meeting #67; Shanghai, China; Source: Qualcomm Incorporated; Title: Revised WI: Enhanced LTE Device to Device Proximity Services (RP-150441)—Mar. 9-12, 2014.

PCT International Search Report for International application No. PCT/EP2017/057341—dated Jun. 8, 2017.

PCT Written Opinion of the International Searching Authority for International application No. PCT/EP2017/057341—dated Jun. 8, 2017.

3GPP TSG-RAN WG4 Meeting #73; San Francisco, US; Source: Intel Corporation; Title: Further discussion on interruption requirements for D2D (R4-147708)—Nov. 21, 2014.

\* cited by examiner

METHODS FOR LIMITING INTERRUPTION IN MULTICARRIER PROSE OPERATION

PRIORITY

This application is a continuation, under 35 U.S.C. § 120 of U.S. patent application Ser. No. 16/088,373 filed on Sep. 25, 2018 which is a U.S. National Stage Filing under 35 U.S.C. § 371 of International Patent Application Serial No. PCT/EP2017/057341 filed Mar. 28, 2017, and entitled "Methods For Limiting Interruption In Multicarrier ProSe Operation" which claims priority to U.S. Provisional Patent Application No. 62/317,178 filed Apr. 1, 2016, both of which are hereby incorporated by reference in their entirety.

TECHNICAL FIELD

The present disclosure relates, in general, to wireless communications and, more particularly, to methods for limiting interruption in multicarrier ProSe operation.

BACKGROUND

Device-to-Device (D2D) communications enable devices in the proximity of each other to communicate in a peer-to-peer (i.e., direct) fashion rather than communicating through some wireless access point (AP) or base station (BS). In practice, D2D user equipment (UEs) in the Third Generation Partnership Project (3GPP) Long Term Evolution (LTE) system utilize the cellular uplink (UL) spectrum (that is, they transmit D2D signals or channels in the UL part of the spectrum).

According to the current standard, D2D operation by a UE is in a half-duplex mode (i.e., the UE can either transmit D2D signals and/or channels or receive D2D signals and/or channels). There may also be D2D relay UEs that relay some signals to other D2D UEs. There is also control information for D2D communication, some of which is transmitted by D2D UEs, and some of which is transmitted by network nodes, such as evolved NodeBs (eNBs) (e.g., D2D resource grants for D2D communication transmitted via cellular downlink (DL) control channels). D2D transmissions may occur on resources that are configured by the network or selected autonomously by the D2D UE.

Specifically in LTE, D2D communication implies transmitting, by a D2D transmitter, D2D data and D2D communication control information with scheduling assignments (SAs) to assist D2D receivers of the D2D data. The D2D data transmissions are performed according to configured patterns and, in principle, may be transmitted rather frequently. SAs are transmitted periodically. D2D transmitters that are within the network coverage may request eNB resources for their D2D communication transmissions and receive in response D2D resource grants for SA and D2D data. Furthermore, the eNB may broadcast D2D resource pools for D2D communication.

D2D discovery messages are transmitted in infrequent periodic subframes. eNodeBs may broadcast D2D resource pools for D2D discovery, both for reception and transmission. In LTE, D2D communication supports two different modes of D2D operation: mode 1 and mode 2.

In mode 1, the location of the resources for transmission of the SA by the broadcasting UE comes from the eNB. The location of the resource(s) for transmission of the D2D data by the broadcasting UE comes from the eNB.

In mode 2, a resource pool for scheduling assignment is pre-configured and/or semi-statically allocated. The UE on its own selects the resource for scheduling assignment from the resource pool for scheduling assignment to transmit its SA.

Primary Cell (PCell) interruption of 1 subframe occurs when a UE switches its reception between D2D-to-Wide Area Network, WAN, or WAN-to-D2D. This is because the UE receiver chain needs to be retuned every time the operation is switched from WAN to D2D reception and from D2D to WAN reception. This applies to both D2D discovery and D2D communication capable UEs. It is important to partition UL resources between cellular UL and D2D operation in such a way that avoids or minimizes the risk of switching taking place in certain subframes of PCell, such as subframe #0 and/or subframe #5. These subframes contain essential information such as Primary Synchronization Sequence (PSS)/Secondary Synchronization Sequence (SSS) that are necessary for doing cell search and carrying out cell measurements. These subframes also contain Master Information Block (MIB)/System Information Block 1 (SIB1) information that is necessary for System Information (SI) reading procedures.

In addition to the interruption that takes places due to switching, there may be an additional interruption of 1 subframe due to the Radio Resource Control (RRC) reconfiguration procedure. While the switching interruption takes place for single receiver UEs (e.g., D2D discovery capable UEs), the RRC reconfiguration interruption takes place for all types of D2D UEs (e.g., D2D Discovery capable and D2D Communication capable UEs).

D2D operation is a generic term that may comprise transmission and/or reception of any type of D2D signals (e.g., physical signals, physical channel, etc.) by a D2D communication capable UE and/or by a D2D discovery capable UE. D2D operation is therefore also referred to as D2D transmission, D2D reception, D2D communication, etc.

As used herein, a D2D UE may be interchangeably referred to as a proximity services, ProSe, capable UE. Similarly, D2D operation may be interchangeably referred to herein as ProSe operation. A D2D discovery capable UE may also be referred to as a UE capable of Prose direct discovery, and a D2D direct communication UE may also be referred to as a UE capable of ProSe direct communication.

The link and carrier that is used for the D2D (i.e., ProSe) direct communication and D2D (i.e., ProSe) direct discovery between UEs is referred to as "sidelink." As non-limiting examples, ProSe operations performed by the UE may include ProSe reception (i.e., receiving ProSe signals) and/or ProSe transmission (i.e., transmitting ProSe signals). Vehicular-to-X (V2X) operation is another variant of D2D operation. V2X enables communication between a vehicle and any one or more of: another vehicle, infrastructure and pedestrian(s). Therefore X may denote "vehicular" (also known as V2V), or X may denote "pedestrian" (also known as V2P) or X may denote "infrastructure" (also known as V2I), and so on. The present disclosure is applicable to any type of D2D operation including ProSe, V2X and so on.

In carrier aggregation (CA), ProSe can be used on a sidelink on any of one or more of the serving cells (e.g., on PCell, on Secondary Cell (SCell), on Primary Secondary Cell (PSCell), etc.). The ProSe-related operations may cause interruption on WAN on the PCell or even on multiple serving cells in CA. Examples of ProSe related operations include turning the ProSe receiver chain on or off to retune the receiver, receiving ProSe (e.g., in case the UE reuses the WAN receiver if it does not have a dedicated receiver for ProSe reception), etc.

The interruption in DL and/or UL of the serving cell due to ProSe may cause serving cell performance degradation in WAN. If the UE has two more SCells, then the interruption may also occur on the activated SCell due to ProSe operations on cells of the Secondary Component Carrier (SCC) with deactivated SCell.

Typically, the interruption on WAN due to retuning of the ProSe receiver can be 1 ms. One metric to express such serving cell performance degradation can be expressed in terms of the serving cell (e.g., PCell) interruption probability of missed Acknowledgement (ACK)/Negative Acknowledgement (NACK) in the UL. The maximum interruption probability or interruption rate (e.g., 0.5%) on WAN due to ProSe can also be pre-defined, or the maximum rate can be configured by a network node. This metric is described in more detail below.

In LTE, the transmission opportunity or scheduling instance is 1 ms (i.e., 1 transmission time interval (TTI)). The number of packets lost in LTE Frequency Division Duplex (FDD) (or Time Division Duplex (TDD) with all DL subframes) is 10, for example, if the UE is unable to transmit 10 ACK/NACK in UL in response to continuous DL transmission over a period of 100 ms. In this example, the corresponding interruption probability of missed ACK/NACK in UL is 10% or 0.1. This may also be stated as the probability with which the fraction of ACK/NACK transmitted in the UL in response to continuous DL transmission over a period are missed or dropped or lost. In some cases, it may also be expressed as a ratio of: the number of missed ACK/NACK in response to continuous transmission of data to the UE from its serving cell over a certain time period (T0); to the total number of ACK/NACK in response to continuous transmission of data to the UE from its serving cell if all data blocks are received.

Herein, the serving cell (e.g., PCell) interruption probability of missed ACK/NACK in the UL may be interchangeably referred to as the "serving cell interruption probability" for simplicity.

The network node is not aware of when the interruption on WAN occurs due to ProSe operation. This may result in loss of data as well as control channel information, including wastage of a scheduling grant. In some cases, the unpredictable loss of scheduling grants may require the network node to reschedule the UE with Physical Downlink Control Channel (PDCCH) using more resource elements (e.g., control channel resource elements) and/or using more transmit power, which results in wastage of resources.

The current specification supports ProSe operation over multiple carriers (also known as multicarrier operation), but only on one carrier at time. The resources used for ProSe operation are spaced over time across multiple carriers (at most 2 UL carriers in Release 13), but simultaneous ProSe operation over the multiple carriers is not allowed. The number of carriers that can be supported for multicarrier ProSe operation can, however, be extended in future releases. For example, up to 32 carriers are possible for CA operation in Release 13. Since ProSe operation takes place on the UL part of the cellular spectrum, this involves some resource sharing with WAN and requires interruptions. The interruptions should be maintained under acceptable levels in order to not degrade the cellular performance, and some requirements have been introduced for this purpose.

FIG. 1 illustrates ProSe operation over multiple carriers. More particularly, FIG. 1 illustrates time 5 on the X-axis and frequency 10 on the Y-axis. A number of instances of ProSe operation 15 are shown on PCell UL 20 and SCell UL 25. Namely, instances of ProSe operation 15A-C are shown in the example of FIG. 1 on PCell UL 20, and instances of ProSe operation 15D-E are shown in the example of FIG. 1 on SCell UL 25.

ProSe Direct Discovery UEs can be equipped with a single receiver and/or transmitter chain that is shared with WAN operation. Gaps are allowed for ProSe Direct Discovery UEs to enable reusing of the receiver and/or transmitter chain of WAN. Gaps may reduce the interruptions to WAN, as the network node is aware of them. Gaps, however, limit the WAN scheduling opportunities to the network node's cellular UEs. In addition, ProSe operation over multiple carriers that is spaced over time may also cause interruptions to WAN operation, and this will in turn degrade the WAN performance. The current requirements only set an upper limit (i.e., the maximum interruption that can be allowed on a carrier). For example, if the maximum interruption rate is 0.5% per carrier and a UE is configured with two or several carriers, the total interruptions on all carriers will be much higher. Excessive ProSe interruptions or gaps during a certain period of time may severely impact the WAN performance.

SUMMARY

To address the foregoing problems with existing approaches, disclosed is a method in a network node for managing interruptions to Wide Area Network (WAN) operation of a wireless device, wherein the wireless device provides Proximity Services (ProSe) over at least two carriers. The method comprises determining a configuration of the wireless device for ProSe operation such that an aggregated interruption to the WAN operation of the wireless device is below an allowed interruption value.

In certain embodiments, the method may comprise determining the configuration of the wireless device based on a periodicity for ProSe operation of the wireless device on one or more of the at least two carriers configured for ProSe operation at the wireless device. In certain embodiments, the method may comprise determining whether gaps are configured or requested for ProSe operation on one or more of the at least two carriers, and determining the configuration of the wireless device based on whether gaps are determined to be configured or requested for ProSe operation on one or more of the at least two carriers.

In certain embodiments, determining the configuration may comprise adapting a ProSe periodicity of at least one of the at least two carriers configured for ProSe operation at the wireless device. The adapted ProSe periodicity of the at least one carrier may be a function of a total number of carriers configured for ProSe operation at the wireless device. The adapted ProSe periodicity of the at least one carrier may be a function of a reference value.

In certain embodiments, the method may comprise determining the configuration of the wireless device based on information about one or more of the at least two carriers configured for ProSe operation at the wireless device. The information about the one or more carriers configured for ProSe operation at the wireless device may comprise one or more of: a number of carriers configured for ProSe operation at the wireless device; a type of carrier configured for ProSe operation at the wireless device; a number of cells configured for ProSe operation at the wireless device; a type of cell configured for ProSe operation at the wireless device; an activation status of at least one of the at least two carriers configured for ProSe operation at the wireless device; a maximum interruption rate of at least one of the at least two carriers configured for ProSe operation at the wireless device; and a target block error rate of at least one of the at least two carriers configured for ProSe operation at the wireless device.

In certain embodiments, determining the configuration may comprise modifying a number of carriers configured for ProSe operation at the wireless device. Determining the configuration may comprise adapting a ProSe scheduling configuration for the wireless device. Determining the configuration may comprise adapting a WAN scheduling configuration for the wireless device.

In certain embodiments, the method may comprise communicating the determined configuration to at least one of: another network node; and one or more wireless devices configured for ProSe operation. In certain embodiments, the allowed interruption value may be based on a number of missed Hybrid Automatic Repeat Request (HARQ) Acknowledgement (ACK)/Negative Acknowledgement (NACK).

Also disclosed is a network node for managing interruptions to Wide Area Network (WAN) operation of a wireless device, wherein the wireless device provides Proximity Services (ProSe) over at least two carriers. The network node comprises: a receiver; a transmitter; memory; and processing circuitry communicatively coupled to the receiver, the transmitter, and the memory. The processing circuitry is configured to determine a configuration of the wireless device for ProSe operation such that an aggregated interruption to the WAN operation of the wireless device is below an allowed interruption value.

Also disclosed is a method in a wireless device for managing interruptions to Wide Area Network (WAN) operation of the wireless device, wherein the wireless device provides Proximity Services (ProSe) over at least two carriers. The method comprises configuring ProSe radio resources on the at least two carriers such that an aggregated interruption to the WAN operation of the wireless device is below an allowed interruption value.

In certain embodiments, the method may comprise performing ProSe operation on the at least two carriers using the configured ProSe radio resources. In certain embodiments, the method may comprise obtaining the allowed interruption value. The allowed interruption value may be based on a number of missed Hybrid Automatic Repeat Request (HARQ) Acknowledgement (ACK)/Negative Acknowledgement (NACK).

In certain embodiments, the method may comprise obtaining a configuration for ProSe operation of the wireless device for the at least two carriers, the obtained configuration comprising at least ProSe radio resources for performing ProSe operation on the at least two carriers, and the configuring ProSe radio resources on the at least two carriers may be based on the obtained configuration. Obtaining the configuration for ProSe operation of the wireless device may comprise receiving the configuration for ProSe operation of the wireless device from a network node.

In certain embodiments, the method may comprise obtaining a minimum value of periodicity with which to configure ProSe operation of the wireless device on the at least two carriers, the minimum value of periodicity comprising a minimum periodicity for ProSe operation that enables the aggregated interruption to the WAN operation of the wireless device to be below the allowed interruption value, and the configuring the ProSe radio resources on the at least two carriers may be based on the obtained minimum value of periodicity. The minimum value of periodicity with which to configure ProSe operation of the wireless device may be a function of a total number of carriers configured for ProSc operation at the wireless device. The minimum value of periodicity with which to configure ProSe operation of the wireless device may be a function of a reference value.

In certain embodiments, the method may comprise comparing the obtained configuration for ProSe operation of the wireless device and the obtained minimum value of periodicity with which to configure ProSe operation of the wireless device. The method may comprise configuring radio resources on at least one of the at least two carriers for performing ProSe operation if a periodicity of ProSe operation on a carrier in the obtained configuration is larger than or equal to the minimum value of periodicity. The method may comprise performing one or more of the following operations if a periodicity of ProSe operation on a carrier in the obtained configuration is less than the minimum value of periodicity: configuring radio resources only on one or more carriers having a periodicity of ProSe operation that is equal to or larger than the minimum value of periodicity; not configuring radio resources on a carrier that has a periodicity of ProSe operation that is less than the minimum value of periodicity; or configuring radio resources on a carrier that has a periodicity of ProSe operation that is less than the minimum value of periodicity after adapting the ProSe periodicity of the carrier to have at least the minimum periodicity. In certain embodiments, the method may comprise informing a network node that the wireless device has configured radio resources on the carrier with an adapted value of ProSe periodicity.

Also disclosed is a wireless device for managing interruptions to Wide Area Network (WAN) operation of the wireless device, wherein the wireless device provides Proximity Services (ProSe) over at least two carriers. The wireless device comprises: a receiver; a transmitter; memory; and processing circuitry communicatively coupled to the receiver, the transmitter, and the memory. The processing circuitry is configured to configure ProSe radio resources on the at least two carriers such that an aggregated interruption to the WAN operation of the wireless device is below an allowed interruption value.

Also disclosed is a network node for managing interruptions to Wide Area Network (WAN) operation of a wireless device), wherein the wireless device provides Proximity Services (ProSe) over at least two carriers. The network node comprises: a receiving module; a communication module; and a determining module communicatively coupled to the receiving module and the communication module. The determining module is configured to determine a configuration of the wireless device for ProSe operation such that an aggregated interruption to the WAN operation of the wireless device is below an allowed interruption value.

Also disclosed is a wireless device for managing interruptions to Wide Area Network (WAN) operation of the wireless device, wherein the wireless device provides Proximity Services (ProSe) over at least two carriers. The wireless device comprises a receiving module; a communication module; and a determining module communicatively coupled to the receiving module and the communication module. The determining module is configured to configure ProSe radio resources on the at least two carriers such that an aggregated interruption to the WAN operation of the wireless device is below an allowed interruption value.

In some embodiments, a non-transitory computer readable memory device storing a computer program comprises program instructions that, when executed on a network node configured to operate in a Wide Area Network, WAN, cause the processing circuitry to: determine a configuration of the wireless device for ProSe operation such that an aggregated interruption to the WAN operation of the wireless device is below an allowed interruption value.

In some embodiments, a non-transitory computer readable memory device stores a computer program for managing interruptions to Wide Area Network, WAN, operation of the wireless device, wherein the wireless device provides Proximity Services, ProSe, over at least two carriers, the computer program comprising program instructions that, when executed on a wireless device configured to provide Proximity Services, ProSe, cause the processing circuitry to configure ProSe radio resources on the at least two carriers such that an aggregated interruption to the WAN operation of the wireless device is below an allowed interruption value.

In some embodiments, a computer program, comprising instructions which, when executed on processing circuitry, causes the processing circuitry to carry out the method according to any example.

Certain embodiments of the present disclosure may provide one or more technical advantages. For example, certain embodiments may ensure that WAN performance is not severely impacted due to ProSc gaps and interruptions caused by ProSc. As another example, certain embodiments may enable resource sharing between WAN and ProSe without severely degrading the performance of each other. As still another example, certain embodiments may allow information to be shared with other nodes, which may advantageously allow ProSe operation over multiple carriers and/or cells to be further coordinated in order to further improve WAN and ProSe performance and allow the potential gains to be achieved in large scale. As yet another example, certain embodiments may allow the configuration for ProSe operation to be derived in one place and then signaled to other nodes in the network, which may advantageously reduce processing in the different nodes in the network. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
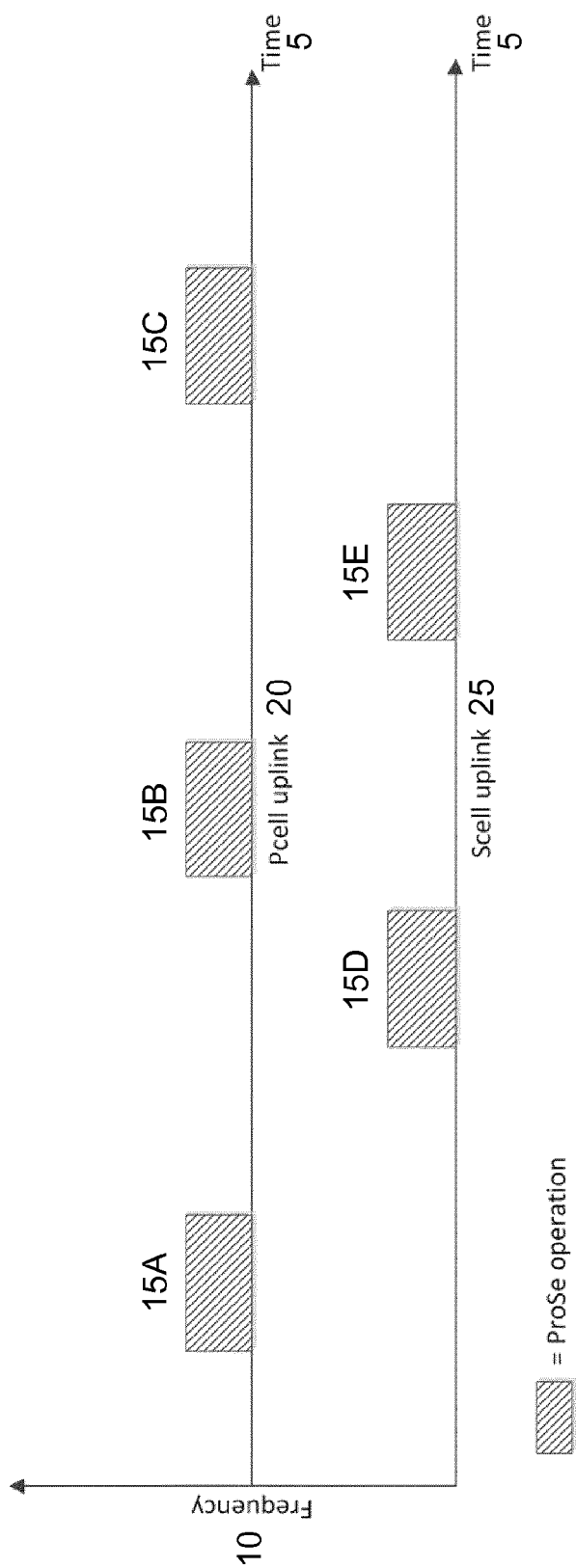
FIG. 1 illustrates ProSe operation over multiple carriers.

As described above, ProSe operation may cause an interruption in DL and/or UL. The network node is not aware when the interruption on WAN occurs due to ProSe operation, which may result in performance degradation in WAN. This performance degradation may include loss of data as well as control channel information (including wastage of scheduling grant). The unpredictable loss of scheduling grants can require the network node to reschedule the UE, which may result in further wasting of resources. Additionally, it is possible that the number of carriers that can be supported for multicarrier ProSe operation could be extended in the future. Since ProSe operation is taking place on the UL part of the cellular spectrum, this involves some resource sharing with WAN and requires interruptions. The present disclosure contemplates various embodiments that may advantageously limit interruption in multicarrier ProSe operation and allow the interruptions to be maintained under acceptable levels in order to avoid degrading cellular performance.

According to one example embodiment, a method in a network node for managing interruptions to WAN operation of a wireless device is disclosed. In some cases, the wireless device may be a ProSe capable wireless device (e.g., a UE), and the network node may be serving the wireless device. The wireless device may provide proximity services over at least two carriers. The network node determines a configuration of the wireless device for ProSe operation such that an aggregated interruption to the WAN operation of the wireless device is below an allowed interruption value. The allowed interruption value may be based on a number of missed HARQ ACK/NACK. In certain embodiments, the network node determines the configuration of the wireless device based on a periodicity for ProSe operation of the wireless device (e.g., every 40 ms, 80 ms, etc.) on one or more of the at least two carriers configured for ProSe operation at the wireless device. The network node may obtain the periodicity for ProSe operation of the wireless device in any suitable manner. In certain embodiments, the network node may determine the configuration of the wireless device based on information about one or more of the at least two carriers configured for ProSe operation at the wireless device. The network node may obtain the information about one or more of the at least two carriers configured for ProSe operation at the wireless device in any suitable manner. In certain embodiments, the network node may determine whether gaps are configured or requested for ProSe operation on one or more of the at least two carriers, and determine the configuration of the wireless device based on whether gaps are determined to be configured or requested for ProSe operation on one or more of the at least two carriers.

In certain embodiments, determining the configuration may comprise adapting a ProSe periodicity of at least one of the at least two carriers configured for ProSe operation at the wireless device. In some cases, determining the configuration may comprise modifying a number of carriers configured for ProSe operation at the wireless device. In some cases, determining the configuration may comprise adapting a ProSe scheduling configuration for the wireless device, for example by adapting the ProSe Direct Discovery periodicity and/or ProSe Direct Communication periodicity, information on when ProSe operation is allowed, and/or information on the maximum interruption allowed on WAN caused by ProSe on said carrier or all carriers. In some cases, determining the configuration may comprise adapting a WAN scheduling configuration for the wireless device, for example by adapting the scheduling of the wireless device such that scheduling in certain subframes or duration are avoided and/or adapting the scheduling such that certain type of wireless devices are not scheduled for certain subframes or duration. In certain embodiments, the network node may communicate the determined configuration to at least one of a receiving node or another type of node in the network.

According to another example embodiment, a method in a wireless device for managing interruptions to WAN operation of the wireless device is disclosed. The wireless device may be a ProSe capable wireless device that provides ProSe over at least two carriers, and may be served by a network node. The wireless device configures ProSe radio resources on the at least two carriers such that an aggregated interruption to the WAN operation of the wireless device is below an allowed interruption value. In certain embodiments, the wireless device obtains a configuration for ProSe operation of the wireless device for the at least two carriers, and configures ProSe radio resources on the at least two carriers based on the obtained configuration. The obtained configuration may comprise at least ProSe radio resources for performing ProSe operation on the at least two carriers. In certain embodiments, the wireless device obtains a minimum value of periodicity with which to configure ProSe operation of the wireless device on the at least two carriers, and configures the ProSe radio resources on the at least two carriers based on the obtained minimum value of periodicity. The minimum value of periodicity may be a minimum periodicity for ProSe operation that enables the aggregated interruption to the WAN operation of the wireless device to be below the allowed interruption value. In certain embodiments, the wireless device performs ProSe operation on the at least two carriers using the configured ProSe radio resources. This may advantageously allow the wireless device to perform ProSe operation on the at least two carriers while not exceeding an allowed interruption value (e.g., a maximum interruption probability in terms of missed HARQ ACK/NACK on WAN operation).

The various embodiments described herein may have one or more technical advantages. For example, certain embodiments may ensure that WAN performance is not severely impacted due to ProSe gaps and interruptions caused by ProSe. As another example, certain embodiments may enable resource sharing between WAN and ProSe without severely degrading the performance of each other. As still another example, certain embodiments may allow information to be shared with other nodes, which may advantageously allow ProSe operation over multiple carriers and/or cells to be further coordinated in order to further improve WAN and ProSe performance and allow the potential gains to be achieved in large scale. As yet another example, certain embodiments may allow the measurement configuration to be derived in one place and then signaled to other nodes in the network, which may advantageously reduce processing in the different nodes in the network.

Figure 2:
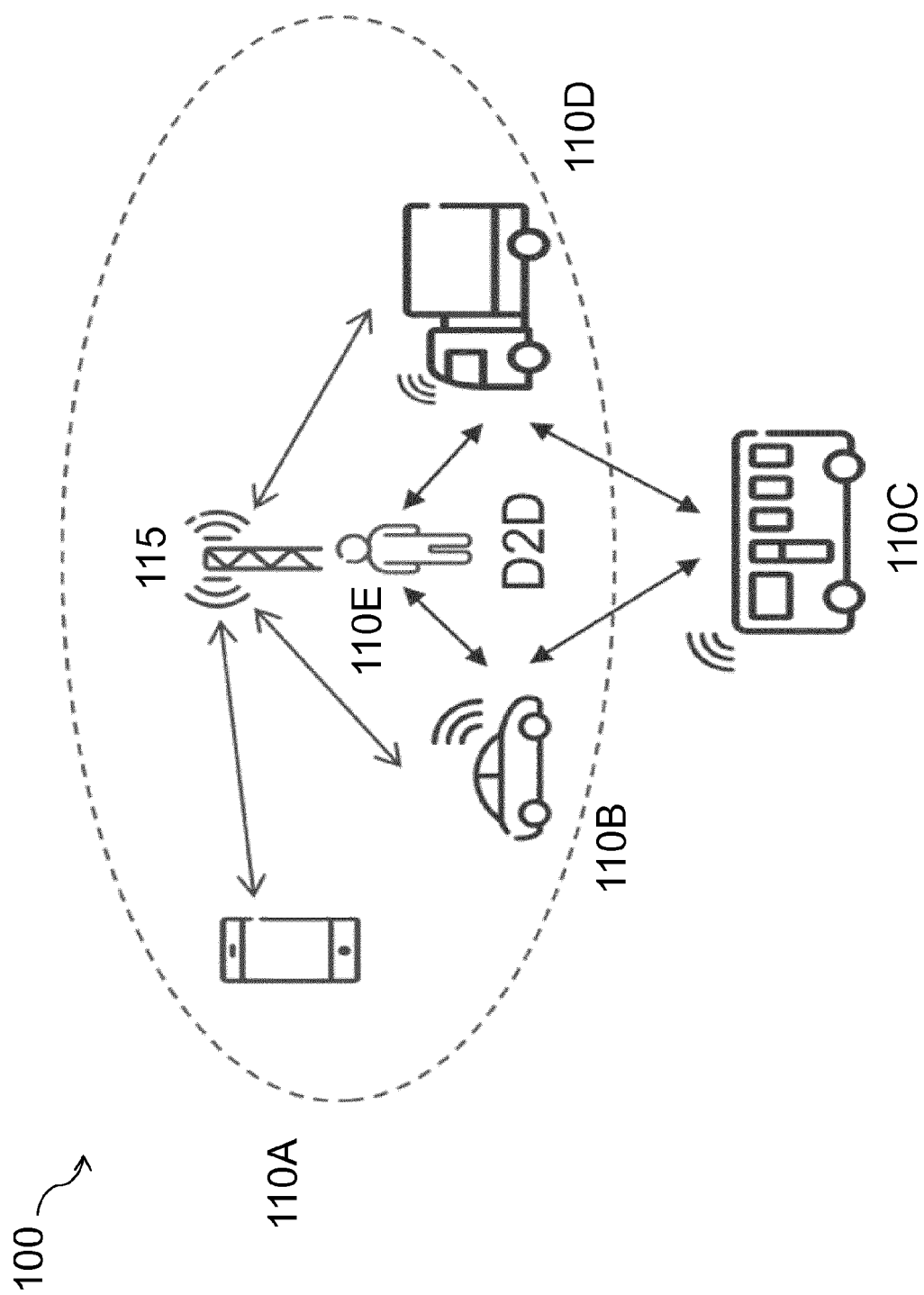
FIG. 2 illustrates an example of a wireless communications network, in accordance with certain embodiments.

FIG. 2 illustrates an embodiment of a wireless communications network 100, in accordance with certain embodiments. More particularly, FIG. 2 is a block diagram illustrating an embodiment of a network 100 that includes one or more UEs 110 (which may be interchangeably referred to as wireless devices 110) and network node(s) 115 (which may be interchangeably referred to as eNBs 115). In the example of FIG. 2, UE 110A is a smart phone, UEs 110B-D are vehicles, and UE 110E is a pedestrian having a wireless device 110, such as, for example, a smart phone. UEs 110 may be ProSe capable UEs (and may be interchangeably referred to as ProSe UEs 110 or D2D UEs 110). UEs 110 may communicate with network node 115, or with one or more other UEs 110 over a wireless interface. For example, UEs 110A, 110B, and 110D may transmit wireless signals to network node 115 and/or receive wireless signals from network node 115. UEs 110 may also transmit wireless signals to other UEs 110 and/or receive wireless signals from other UEs 110. For example, UEs 110B, 110C, 110D, and 110E may communicate using D2D communication. The wireless signals may contain voice traffic, data traffic, control signals, and/or any other suitable information. In some embodiments, an area of wireless signal coverage associated with network node 115 may be referred to as a cell.

In certain embodiments, network node 115 may interface with a radio network controller. The radio network controller may control network node 115 and may provide certain radio resource management functions, mobility management functions, and/or other suitable functions. In certain embodiments, the functionality of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionalities for UEs 110. UE 110 may exchange certain signals with the core network node using the non-access stratum layer. In non-access stratum signaling, signals between wireless device 110 and the core network node may be transparently passed through the radio access network. Example embodiments of UE 110, network node 115, and other network nodes (such as radio network controller or core network node) are described in more detail below with respect to FIGS. 10-14 below.

In some embodiments, the general term "network node" is used and it can correspond to any type of radio network node or any network node that communicates with a UE and/or with another network node. Examples of network nodes include, but are not limited to, NodeB, MeNB, SeNB, a network node belonging to MCG or SCG, base station (BS), multi-standard radio (MSR) radio node such as MSR BS, eNB, gNB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g., MSC, MME, etc.), O&M, OSS, SON, positioning node (e.g., E-SMLC), MDT or any other suitable network node.

In some embodiments, the non-limiting term UE is used and it refers to any type of wireless device communicating with a network node and/or with another UE in a cellular or mobile communication system. Examples of UE include target device, D2D/ProSe UE, machine-type-communication (MTC) UE or UE capable of machine-to-machine communication (M2M), low-cost and/or low-complexity UE, a sensor equipped with UE, PDA, PAD, Tablet, mobile terminals, smart phone, laptop embedded equipment (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In certain embodiments, UE 110 may be capable of operating in out-of-network coverage (ONC) scenarios.

The terminology such as network node and UE should be considered non-limiting and does in particular not imply a certain hierarchical relation between the two; in general "eNB" could be considered as device 1 and "UE" device 2, and these two devices communicate with each other over some radio channel.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which the UE receives and/or transmits signals (e.g., data). For example, the various embodiments described herein may be applicable to NR, LTE FDD/TDD, LTE-Advanced, UMTS, WCDMA/HSPA, GSM/GERAN, CDMA2000, WiMax, WiFi, WLAN, another suitable radio access technology, or any suitable combination of one or more radio access technologies. Moreover, although the various embodiments may be described as implemented for ProSe Direct Communication type UEs, the present disclosure contemplates that the various embodiments described herein are applicable to other types of ProSe UEs (such as, for example, ProSe Direct Discovery capable UEs).

Although certain embodiments may be described in the context of wireless transmissions in the DL, the present disclosure contemplates that the various embodiments are equally applicable in the UL. Moreover, the various embodiments described herein are applicable for WAN and/or ProSe operations on single carrier or on multicarrier (also known as CA). The embodiments are also applicable for WAN and/or ProSe operations in dual connectivity (DC).

Furthermore, although certain example embodiments may be described in terms of sidelink and WAN communication link (for example, as a first communication link and a second communication link, respectively), the various embodiments are not limited to such an example. Rather, the present disclosure contemplates that the first communication link and second communication links may be any suitable communication links, and that the various embodiments may be applicable to any scenario in which one communication link is subject to interruption by operation of a second communication link.

As described above, ProSe operation may cause an interruption in DL and/or UL, leading to performance degradation in WAN, such as the loss of scheduling grants. Additionally, it is possible that the number of carriers that can be supported for multicarrier ProSe operation could be extended in the future. Since ProSe operation is taking place on the UL part of the cellular spectrum, this involves some resource sharing with WAN and requires interruptions.

The present disclosure contemplates various embodiments that may advantageously limit interruption in multicarrier ProSe operation and allow the interruptions to be maintained under acceptable levels in order to avoid degrading cellular performance. In certain embodiments, this may be achieved through a method in network node 115 (such as an eNB). The various embodiments described herein are applicable to a variety of scenarios. Certain example scenarios in which the various embodiments may be applied are described below.

In some cases, network node 115 may be serving a first cell, say PCell (also known as serving cell). A UE 110, such as UE 110B, may be a ProSe capable wireless device and pre-configured by the PCell with ProSe resources for ProSe operation on a sidelink. The pre-configured ProSe resources may be used by UE 110B when operating in ONC. The sidelink may typically operate on a carrier of the PCell (also known as a serving carrier frequency or an intra-frequency carrier). The sidelink may also be configured for ProSe operation on a non-serving carrier of UE 110B. The non-serving carrier can be an inter-frequency carrier, inter-RAT carrier, or any carrier which is not configured as the serving carrier. For example, the non-serving carrier can be the one configured as an inter-frequency carrier frequency for doing WAN measurements, or a carrier frequency only configured for ProSe operation.

In certain embodiments, ProSe may also be configured with another cell that is configurable on an as-needed basis, for example SCell1. In some cases, the SCell1 may be served by a second network node (e.g., a second eNB). The various embodiments described herein are applicable regardless of whether PCell and one or more SCells are served by the same or different network nodes. In this case, UE 110B can be pre-configured with ProSe resources for ProSe operation on sidelink, which may operate on a carrier of PCell or of SCell or of any non-serving carrier. UE 110B can be pre-configured with ProSe resources for ProSe operation on a plurality of sidelinks (e.g., carriers of PCell, SCell1 and non-serving carrier).

Network node 115 may also configure UE 110B with a third cell, SCell2 on a different carrier on an as-needed basis. The various embodiments described herein are applicable for a UE configured with CA with any number of SCells and/or multicarrier operation with any number of carriers.

In certain embodiments, the UE may be configured with PCell and PSCell or with PCell, PSCell and one or more SCells (such as in dual connectivity). The configured cells are UE specific, and the various embodiments described herein may be applied on a UE basis on each configured cell.

In some cases, UE 110B may also be configured with one or more carriers for performing measurements on the cells of the configured carriers. UE 110B may be configured with such carriers for measuring in idle state and/or in connected state.

Currently, there are no restrictions or requirements on how often gaps can be requested by a ProSe UE and granted by the network node for performing ProSc operation on multiple carriers. Also, there are no restrictions on how often interruptions due to ProSe operation on multiple carriers can be caused on WAN operation. The use of gaps in certain example scenarios is further described below.

In certain embodiments, UE 110B may be configured with at least one serving cell (e.g., PCell) on a first carrier (F1). In a first example case, UE 110B intends to start ProSe (e.g., discovery) on UL resources (e.g., sidelink) of at least one non-serving cell (cell2) on a second, non-serving carrier (F2). In this first example case, UE 110B sends a request to network node 115, and in response network node 115 may assign gaps to UE 110B for Prose on cell2 on F2.

In a second example case, network node 115 can request UE 110B to start ProSe (e.g., discovery) on the UL resources of cell2 on F2. In this second example case, network node 115 sends a request to UE to start ProSe on F2 using gaps, and also provides a gap configuration and any other suitable information.

During the gaps, UE 110B is not required to receive and transmit signals in the serving cell. The gaps (i.e., cessation of serving cell operation) allow UE 110B to reuse its resources (e.g., receiver, local oscillator, radio frequency (RF) components like power amplifier) for doing ProSe operation. In the gaps, UE 110B can receive and/or transmit ProSe signals on the non-serving cell. This configuration may be interchangeably referred to herein as the first gap configuration.

The gaps may have any suitable characteristics. For example, in some cases the gaps may be periodic or aperiodic. In some cases, the gaps may be one shot (e.g., one gap is configured at UE 110B at a time). Non-limiting examples of gaps include periodic measurement gaps used by UE 110B for performing UE measurements. The gaps are typically network node controlled (i.e., configured by network node 115). In one non-limiting example, such periodic measurement gaps may have a gap length of 6 ms occurring every 40 ms or 80 ms. In some cases, the gap length may be shorter or longer than 6 ms (e.g., it can be equal to the duration over which ProSe operation is to be performed by UE 110B). An example of a shorter gap is 3 ms. An example of a longer gap is 20 ms.

The gap configuration may be expressed in any suitable manner. In certain embodiments, for example, the gap configuration may be expressed in terms of a bit map that can be signaled by network node 115 to UE 110B. UE 110B, upon receiving the gap configuration, creates the gaps based on the received information. The bit map may be periodic or aperiodic. As one example, a periodic bit map with 5 subframe gap every second frame may be expressed in terms of bit map as: {0000111110}, {0000000000}, {0000111110}, {0000000000}, . . . }. As another example, a periodic bit map with a gap of 6 subframes may be expressed in terms of bit map as: {0000111111}. In the above examples, bit "1" means subframe with gap and bit "0" means subframe with serving cell operation. Within each gap, it may be assumed that 1 subframe is used for RF tuning from the serving to non-serving carriers and also that 1 ms is used for RF tuning from the non-serving to serving carriers. As described above, according to one example embodiment a method in a network node, such as network node 115, for managing interruptions to WAN operation of a wireless device is disclosed. In some cases, network node 115 may be serving a ProSe capable wireless device (e.g., UE 110B). UE 110B may provide proximity services over at least two carriers. Network node 115 determines a configuration of UE 110B for ProSe operation such that an aggregated interruption to the WAN operation of UE 110B is below an allowed interruption value. The allowed interruption value may be based on a number of missed HARQ ACK/NACK. In certain embodiments, network node 115 determines the configuration of UE 110B based on a periodicity for ProSe operation of UE 110B (e.g., every 40 ms, 80 ms, etc.) on one or more of the at least two carriers configured for ProSe operation at UE 110B. In certain embodiments, network node 115 may determine the configuration of UE 110B based on information about one or more of the at least two carriers configured for ProSe operation at UE 110B (e.g., PCell cell only, PCell and SCell, PCell-SCell1 and SCell2, etc.). In certain embodiments, network node 115 may determine whether gaps are configured or requested for ProSe operation on one or more of the at least two carriers, and determine the configuration of UE 110B based on whether gaps are determined to be configured or requested for ProSe operation on one or more of the at least two carriers.

Network node 115 may obtain a periodicity for ProSe operation of UE 110B in any suitable manner. In certain embodiments, for example, network node 115 may obtain the periodicity for ProSe operation of UE 110B by determining the periodicity for ProSe operation (e.g., autonomously, based on one or more pre-defined rules, or based on information received from another network entity such as another network node or a UE (e.g., UE 110B)). As another example, network node 115 may obtain the periodicity for ProSe operation of UE 110B by receiving the periodicity for ProSe operation (or an indication thereof) from another network entity (e.g., another network node or a UE, such as UE 110B).

The periodicity of ProSe operation refers to how frequently the ProSe operation may occur (e.g., every 40 ms, 80 ms, etc.). The periodicity of ProSe operation may include one or more of ProSe Direct Discovery, ProSe Direct Communication, or any other suitable ProSe operation. In some cases, different types of ProSe operation may have different periodicities. For example, the periodicity of ProSe Direct Discovery may be different than the periodicity of ProSe Direct Communication. As another example, ProSe services may be used for public safety purposes, and the periodicity of such operation may be different than that of commercial operation. To illustrate, the periodicities that are supported for public safety ProSe Direct Discovery are: 40 ms, 80 ms, 160 ms, 320 ms, etc. The ProSe Direct Discovery periodicities that are supported for commercial operation are: 320 ms, 640 ms, 1280 ms, etc.

ProSe resources can be allocated to ProSe UE 110B in any suitable manner. In some cases, the manner of allocating ProSe resources to UE 110B enables the periodicity information for ProSe operation of UE 110B to be known by network node 115. As one example, radio resources may be explicitly provided to UE 110B by network node 115. This may advantageously allow the periodicity information for ProSe operation of UE 110B to be known to network node 115. As another example, UE 110B may choose resources from a preconfigured resource pool that is known to network node 115. Such an approach may also advantageously allow the periodicity information for ProSe operation of UE 110B to be known to network node 115.

Network node 115 may obtain the periodicity for ProSe operation of UE 110B in other ways as well. As non-limiting examples, in certain embodiments the periodicity for ProSe operation of UE 110B may be one or more of: pre-configured by network node 115; pre-defined in a specification; and/or pre-defined in the hardware (including SIM). In these cases, the periodicity for ProSe operation of UE 110B is expected to be well known, and UE 110B may use some default periodicity. In other cases, network node 115 may obtain periodicity related information explicitly from UE 110B or retrieve it from other nodes in the network (e.g., another network node or UE).

Network node 115 may obtain information about the one or more carriers configured for ProSe operation at UE 110B in any suitable manner. As one example, network node 115 may determine the information about one or more carriers configured for ProSe operation at UE 110B (e.g., autonomously, based on one or more pre-defined rules, or based on information received from another network entity such as another network node or UE). As another example, network node 115 may obtain the information about the one or more carriers configured for ProSe operation at UE 110B by receiving the information about the one or more carriers (or an indication thereof) from another network entity (e.g., another network node or UE, such as UE 110B).

The information about the one or more carriers configured for ProSe operation at UE 110B may be any suitable information. For example, the information about the one or more carriers may include one or more of: what carriers are supported by UE 110B for ProSe operation; how many carriers are supported by UE 110B for ProSe operation; what cells are supported by UE 110B for ProSe operation; how many cells are supported by UE 110B for ProSe operation; whether or not the carriers and/or cells supported by UE 110B for ProSe operation are always activated; whether UE 110B is restricted by a maximum interruption rate; whether UE 110B is restricted by a block error rate (BLER) target; and any other suitable information applicable for ProSe operation on the one or more carriers.

Generally, the above mentioned information is known to serving network node 115 since it is the task of network node 115 to configure the UE with CA. All UEs have a primary serving cell (PCell) and network node 115 may configure UE 110B with secondary serving cells known as SCells. Typically, SCells are configured by network node 115 on an as-needed basis (e.g., depending on any suitable criteria such as data traffic UE 110B is expected to transmit and/or receive, a load in the cell, etc.). Such additional cells can be deployed on the same or different frequency bands. UE 110B could be under control of a PCell, SCell, or also under PSCell (in case dual connectivity is supported). These additional cells can be activated and deactivated by network node 115. Hence, information related to how many carriers and/or cells are supported by UE 110B served by network node 115 and information related to whether or not these are currently activated or deactivated may be known to network node 115.

In some cases, additional requirements may apply that are specific to the carrier on which UE 110B is configured. An example of such restrictions is a limitation on the maximum interruption rate. For example, UE 110B may be required to maintain interruption to WAN below a certain level (which could depend on, for example, a Discontinuous Reception (DRX) cycle length, a type of operation, etc.). Since ProSe operation may cause interruptions to WAN, in such a scenario UE 110B may be required to maintain a maximum interruption rate (e.g., 0.5% or 0.625%) per carrier. This would mean that the probability of incorrect ACK/NACK transmission in the UL should not exceed this rate. Typically, this information is well known and specified in a document (e.g., specification), configured in network node 115, or explicitly signaled to network node 115 by UE 110B.

As another example, UE 110B may be required to maintain a BLER target on WAN operation. The target could be specific to a certain channel, carrier, cell, etc. Typically, this information is also well known and specified in a document (e.g., specification), configured in network node 115, or explicitly signaled to network node 115 by UE 110B.

In certain embodiments, network node 115 may also determine whether gaps are configured or requested for ProSe operation on the one or more carriers. Network node 115 may determine whether gaps are configured or requested in any suitable manner. For example, in some cases this information is known to network node 115 because it is network node 115 that receives a gap request from UE 110B and grants gaps. Hence, it is reasonable to assume that it is known to network node 115 when gaps are configured and to which UEs. A UE, such as UE 110B, may or may not require gaps for performing ProSe operation (depending on UE capability).

Network node 115 determines a configuration of UE 110B for ProSe operation such that an aggregated interruption to the WAN operation of UE 110B is below an allowed interruption value. In some cases, network node 115 determines the configuration for ProSe operation based on the obtained periodicity for ProSe operation of UE 110B and the obtained information about the one or more carriers configured for ProSe operation at UE 110B. In certain embodiments, network node 115 may further determine the configuration for ProSe operation of UE 110B based on whether gaps are determined to be configured or requested for ProSe operation on the one or more carriers.

In determining the configuration for UE 110B, network node 115 may adapt the configuration for ProSe operation in any suitable manner. For example, in certain embodiments determining the configuration for ProSe operation may include adaptation of ProSe Scheduling, including one or more of: adapting the ProSe Direct Discovery periodicity and/or ProSe Direct Communication periodicity; adapting when ProSe operation is allowed; and adapting the maximum interruption allowed on WAN caused by ProSe operation on the one or more carriers. As another example, in certain embodiments determining the configuration for ProSe operation may include adaptation of WAN scheduling, including one or more of: adapting the WAN scheduling such that scheduling of UE 110B in certain subframes or duration is avoided; and adapting the WAN scheduling such that one or more types of UEs are not scheduled in certain subframes or duration.

In determining the configuration for ProSe operation of UE 110B, network node 115 may determine one or more parameters associated with a configuration related to ProSe operation on multiple carriers. As described above, the current specification supports ProSe operation over multiple carriers (also known as multicarrier operation), but only on one carrier at time. The resources used for ProSe operation are spaced over time across multiple carriers (at most 2 UL carriers in Release 13), but simultaneous ProSe operation over the multiple carriers is not allowed. The number of carriers than can be supported for multicarrier ProSe operation, however, can be extended in future releases. Up to 32 carriers are possible for CA operation in Release 13. Since ProSe operation is taking place on the UL part of the cellular spectrum, this involves some resource sharing with WAN and requires interruptions. The interruptions should be maintained under acceptable levels in order to not degrade the cellular performance, and some requirements have been introduced for this purpose.

ProSe Direct Discovery UEs can be equipped with a single receiver and/or transmitter chain that is shared with WAN operation. Gaps are allowed for ProSe Direct Discovery UEs to enable reusing of the receiver and/or transmitter chain of WAN. Gaps may reduce the interruptions to WAN as the network node is aware of them; however, it limits the WAN scheduling opportunities to its cellular UEs. In addition, ProSe operation over multiple carriers that is spaced over time may also cause interruptions to WAN operation. This will in turn degrade the WAN performance. Currently, there are no restrictions or requirements on how often such gaps can be requested by UE 110B and granted by network node 115. Also, there are not restrictions on how often such interruptions can be caused on WAN. The existing requirements currently only set an upper limit (i.e., the maximum interruption that can be allowed on a carrier). For example, if the maximum interruption rate is 0.5% per carrier and UE 110B is configured with two or several carriers, the total interruptions on all carriers will be much higher. Aggregated ProSe interruptions or gaps over multiple carriers during a certain period of time may severely impact the WAN performance (e.g., loss of data, loss of control information, degradation of quality of service (e.g., higher BLER value), etc.). This problem may be advantageously overcome by network node 115 adapting the configuration for ProSe operation of UE 110B, as described in more detail below.

In certain embodiments, network node 115 can get a picture of the ProSe operation for UE 110B from the obtained periodicity for ProSc operation of UE 110B and the obtained information about one or more carriers configured for ProSe operation at UE 110B described above (and, in certain embodiments, whether gaps are determined to be configured or requested for ProSe operation on the one or more carriers).

For example, the periodicity for ProSe operation of UE 110B (or information related thereto) obtained by network node 115 may provide information on how frequent the ProSe operation may take place, and also information on how long each ProSe burst occurs. The ProSe periodicity can be denoted as $T_{ProSe}$. If UE 110B is configured with several carriers for ProSe operation, $T_{ProSe}$ refers to the shortest periodicity of the several carriers.

The information about the one or more carriers configured (or requested) for ProSe operation at UE 110B obtained by network node 115 provides information on how many carriers are used for ProSe operation. The number of carriers configured or supported for ProSe operation can be denoted as $N_{ProSe-freq}$.

In certain embodiments, the information about whether gaps are configured or requested for ProSe operation determined by network node 115 provides information on whether dedicated receiver chain or transmitter chains are used for ProSe operation on multiple carriers, or if cellular chains are reused to perform ProSe operation.

By combining all the information obtained and/or determined by network node 115, network node 115 may get a picture of the ProSe operation as illustrated in FIGS. 3-7, described in detail below.

Figure 3:
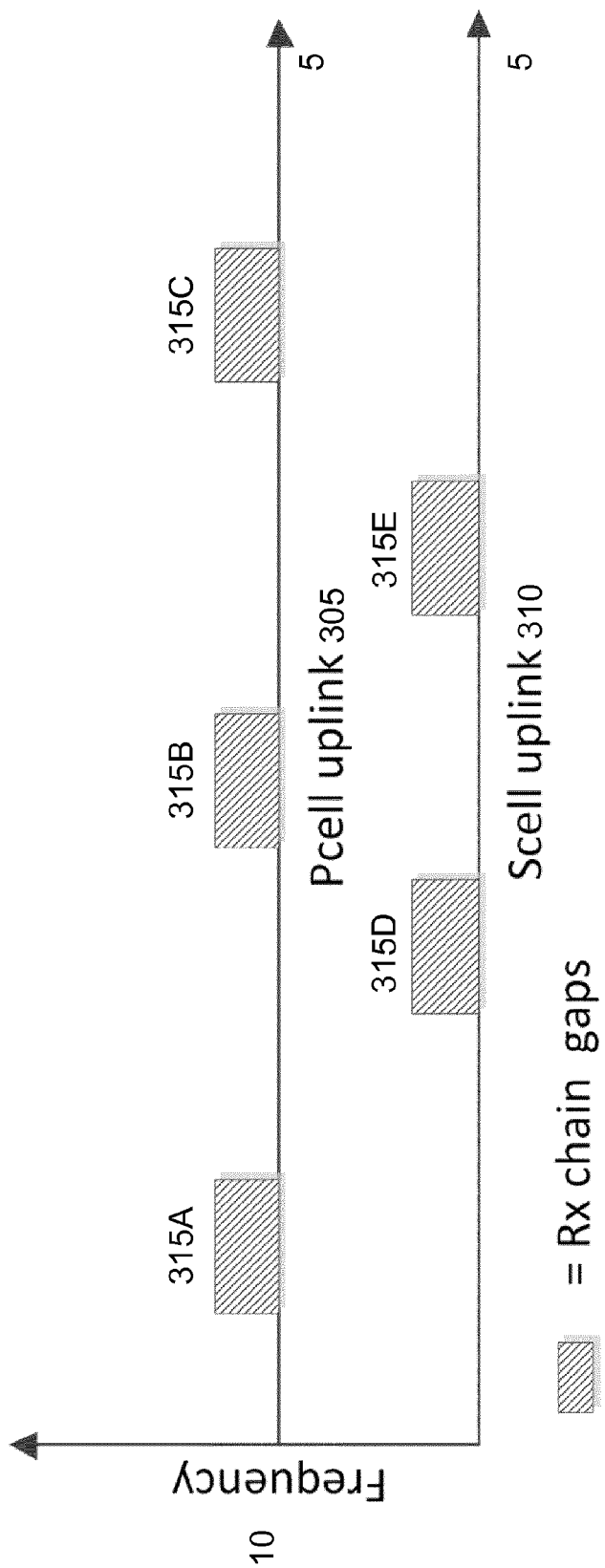
FIG. 3 illustrates ProSe operation on two carriers with gaps used for the receiver chain, in accordance with certain embodiments.

FIG. 3 illustrates ProSe operation on two carriers with gaps used for the receiver chain, in accordance with certain embodiments. In FIG. 3, time 5 is on the X-axis and frequency 10 is on the Y-axis. In the example of FIG. 3, ProSe operation is allowed on two carriers (PCell 305 on carrier frequency F1 and SCell 310 on carrier frequency F2). A plurality of receiver chain gaps 315 (more specifically, receiver chain gaps 315A-E) are used on different occasions on PCell 305 and SCell 310 in order to reuse the receiver chain from cellular operation.

Figure 4:
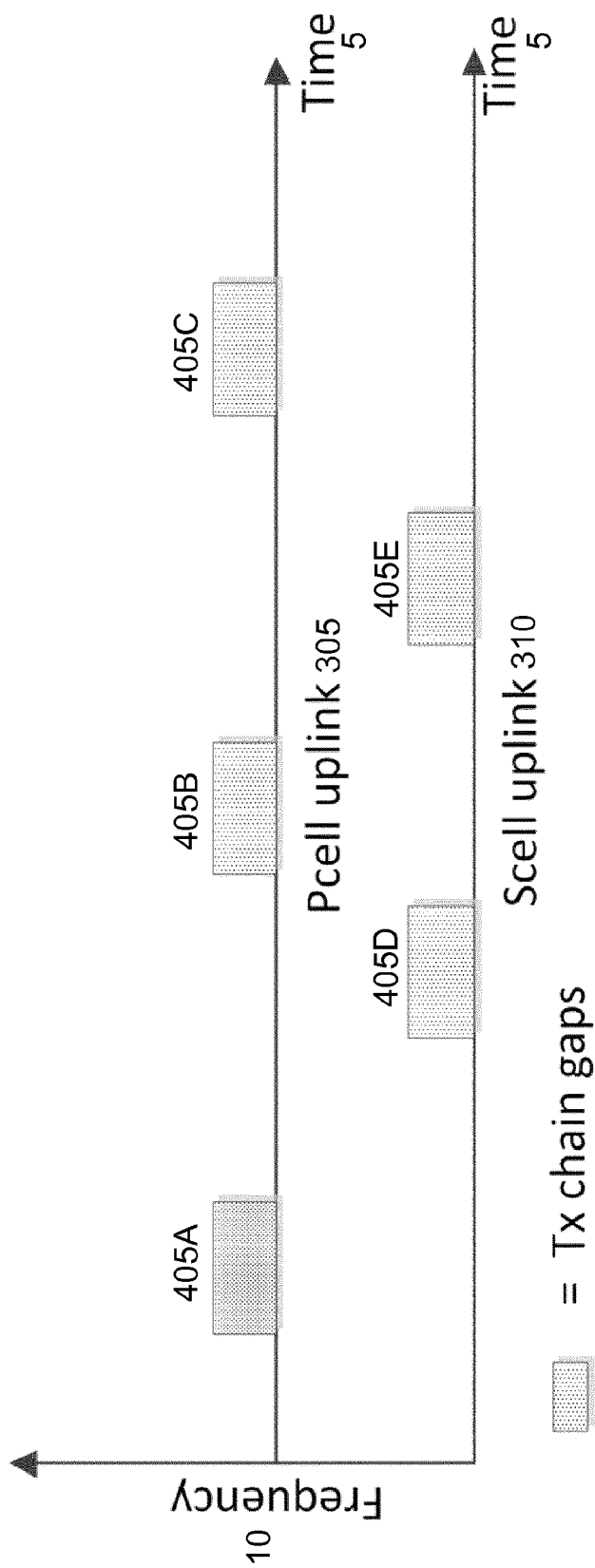
FIG. 4 illustrates ProSe operation on two carriers with gaps used for the transmitter chain, in accordance with certain embodiments.

FIG. 4 illustrates ProSe operation on two carriers with gaps used for the transmitter chain, in accordance with certain embodiments. In FIG. 4, time 5 is on the X-axis and frequency 10 is on the Y-axis. In the example of FIG. 4, ProSe operation is allowed on two carriers (PCell 305 on carrier frequency F1 and SCell 310 on carrier frequency F2). A plurality of transmitter chain gaps 405 (more specifically, transmitter chain gaps 405A-E) are used on different occasions on PCell 305 and SCell 310 in order to reuse the transmitter chain from cellular operation.

Figure 5:
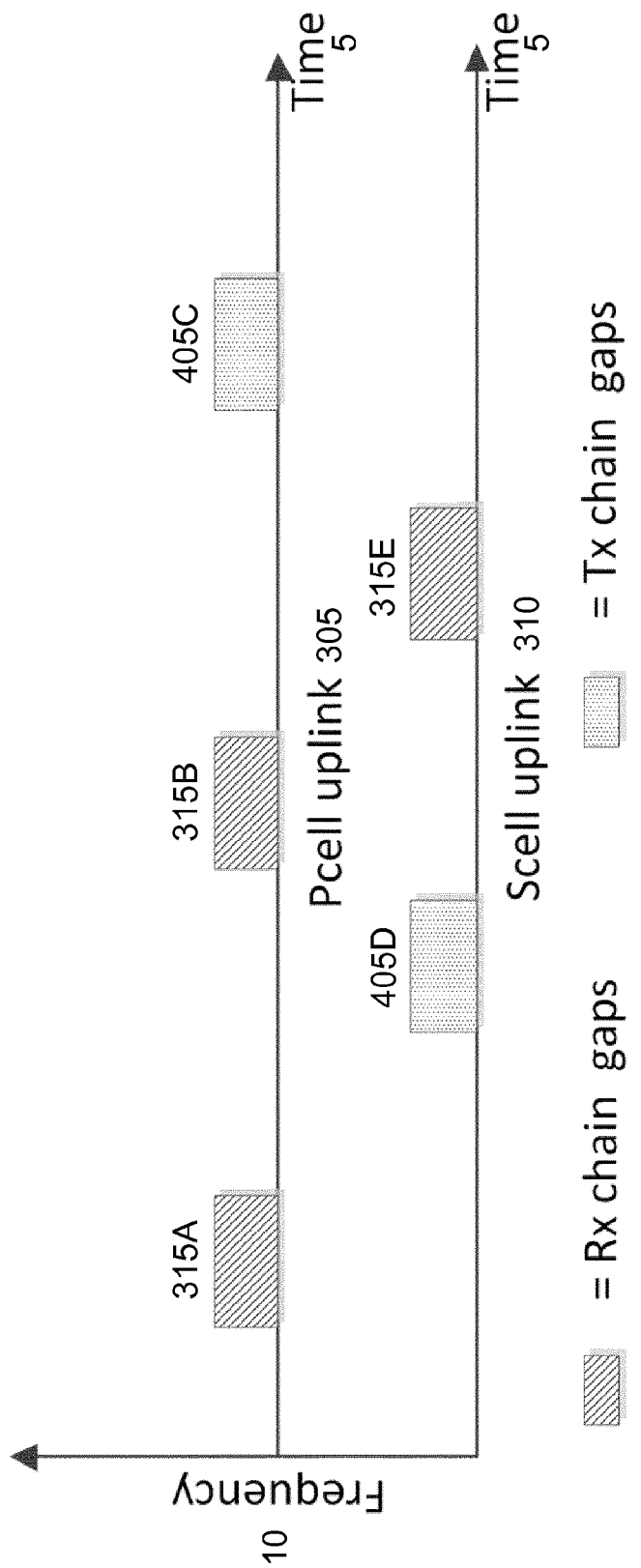
FIG. 5 illustrates ProSe operation on two carriers with gaps used for the receiver and transmitter chains, in accordance with certain embodiments.

FIG. 5 illustrates ProSe operation on two carriers with gaps used for the receiver and transmitter chains, in accordance with certain embodiments. In FIG. 5, time 5 is on the X-axis and frequency 10 is on the Y-axis. In the example of FIG. 5, ProSe operation is allowed on two carriers (PCell 305 on carrier frequency F1 and SCell 310 on carrier frequency F2). Both receiver chain gaps 315 and transmitter chain gaps 405 are used on different occasions on PCell 305 and SCell 310 in order to reuse the receiver and transmitter chain from cellular operation. For example, over the period of time 5 illustrated in FIG. 5 receiver chain gaps 315A and 315B and transmitter chain gap 405C occur on PCell 305, and transmitter chain gap 405D and receiver chain gap 315E occur on SCell 310.

FIGS. 3-5 above show that the gaps (e.g., receiver chain gaps 315 and transmitter chain gaps 405) can be very dense, and interruptions (if any) can also be dense. In some cases, retuning of frequency between WAN and ProSe may take place outside the gaps, and this will cause interruptions on all configured serving cells for WAN operation. In other cases, interruptions may be caused due to retuning between ProSe transmitter and ProSe receiver, and this may cause interruptions on WAN. In some cases, since interruptions are unpredictable this is not known to the serving network node. This kind of operation and behavior can adversely impact the WAN performance, and the consequence can be reduced system and user performance.

Returning to FIG. 2, network node 115 determines the configuration of UE 110B for ProSe operation on the at least two carriers such that an amount of aggregated interruption to the WAN operation of UE 110B is below an allowed interruption value. The configuration may be determined based on the obtained periodicity for ProSe operation of UE 110B and the obtained information about the one or more carriers configured for ProSe operation at UE 110B. In some cases, the configuration may also be determined based on whether gaps are determined to be configured or requested for ProSe operation on the one or more carriers.

According to one example embodiment, network node 115 determines the configuration for ProSe operation by adapting the ProSe periodicity per carrier. This may be achieved using the general expression according to Equation 1 below:

$$T_{ProSe-new} = f(T_{ProSe-ref}, N_{ProSe-freq}) \quad (1)$$

A specific rule can be specified according to Equation (2) as follows:

$$T_{ProSe-new} \geq T_{ProSe-ref} * N_{ProSe-freq} \quad (2)$$

In the above expression in Equation (2), $T_{ProSe-new}$ is the minimum periodicity with which sidelink resources are configured on each carrier (e.g., any of PCell 305, SCell 310, non-serving carrier, etc.) for ProSe operation. It is expressed in time resources (e.g., TTI, seconds, subframes, X ms, etc.). $T_{ProSe\_ref}$ is a reference value. As an example, $T_{ProSe\_ref}$ can be the minimum periodicity with which sidelink resources are configured on a carrier for ProSe operation if ProSe is configured only on one carrier. In another example, $T_{ProSe\_ref}$ can be the minimum value specified in the standard as part of sidelink configuration (e.g., 40 ms). $N_{ProSe-freq}$ is the total number of carriers on which the ProSe operation is configured for a UE (i.e., total number of carriers with sidelinks for the UE).

The new ProSe periodicity in $T_{ProSe-new}$ will ensure that the ProSe burst/operations on different sidelinks belonging to different carriers are spaced apart in time by at least $T_{ProSe-new}$. Consequently, this will ensure that WAN performance is not severely impacted and the WAN resources are not overused by ProSe. WAN resources in this sense may also include WAN hardware (e.g., receiver chains and transmitter chains). In other words, the aggregated interruption on WAN due to retuning or gaps for ProSe operation on multiple carriers will remain within a certain limit (e.g., within 0.625% of interruption probability on WAN) regardless of number of carriers with sidelink.

In certain embodiments, the new periodicity determined above can be defined using the information element (IE) SL-DiscResourcePool for Discovery or IE SL-CommConfig for Communication.

The adaptation of the ProSe periodicity of ProSe resources on sidelink on a carrier is further described with examples below.

In a first example, it is assumed that UE 110B is configured with two carriers for ProSe operation. Assume that based on existing approaches the intended ProSe periodicities are as follows: $T_{ProSe1}$=40 ms, and $T_{ProSe2}$=320 ms, and $N_{ProSe-freq}$=2. Assume further that $T_{ProSe\_ref}$=40 ms. Based on the rule according to Equation (1) above, the minimum value of periodicity for ProSe sidelink resources on any of the two carriers in this first example will be according to Equation (3) below:

$$T_{ProSe\_new} \geq 40*2 \quad (3)$$

This means that the new minimum periodicity for ProSe is 80 ms ($T_{ProSe-new} \geq 80$) on each carrier. This is illustrated in FIG. 6 below.

Figure 6:
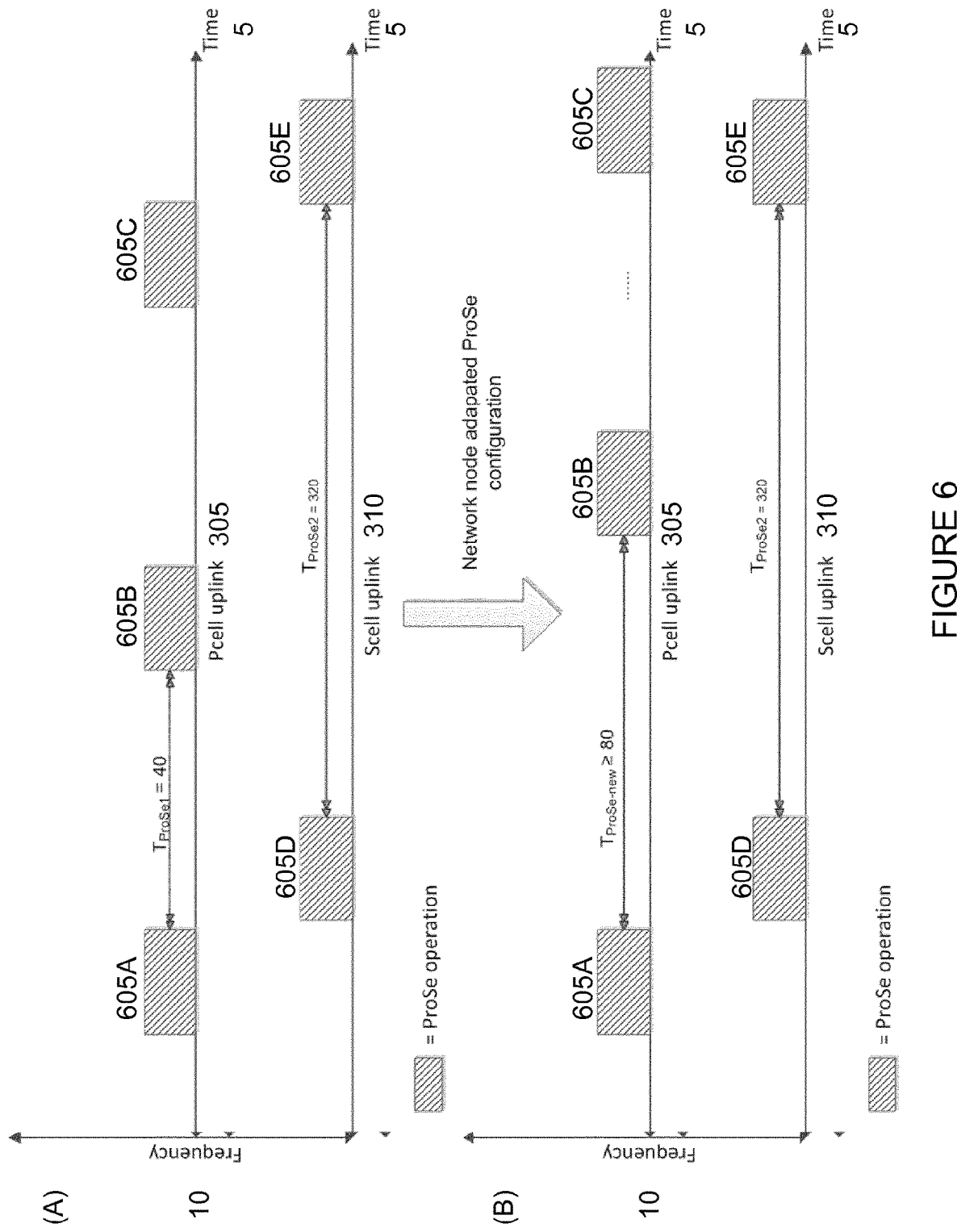
FIG. 6 illustrates an example adaptation of the ProSe periodicity of ProSe resources on sidelink on two carriers, in accordance with certain embodiments.

FIG. 6 illustrates an example adaptation of the ProSc periodicity of ProSe resources on sidelink on two carriers, in accordance with certain embodiments. More particularly, FIG. 6 illustrates two scenarios: Scenario (A) and Scenario (B). Scenario (A) illustrates ProSe operation before the configuration for ProSe operation of a UE on PCell 305 and SCell 310 is adapted so that an amount of interruptions to WAN operation of the UE is below an allowed interruption value. Scenario (B) illustrates ProSe operation after the configuration for ProSe operation of the UE on PCell 305 and SCell 310 has been adapted so that the amount of interruptions to WAN operation of the UE is below the allowed interruption value.

In the example of FIG. 6, ProSe operation takes place over multiple carriers. In FIG. 6, time 5 is on the X-axis and frequency 10 is on the Y-axis. A number of instances of ProSe operation 605 are shown. Namely, instances of ProSe operation 605A-C are shown in the example of FIG. 6 on PCell 305, and instances of ProSe operation 605D-E are shown in the example of FIG. 1 on SCell 310.

Scenario (A) reflects the intended periodicities of ProSe operation described above in the first example of adaptation of the ProSe periodicity of ProSe resources on sidelink on a carrier described above. More particularly, PCell 305 has a periodicity of 40 ms (i.e., $T_{ProSe1}$=40 ms) and SCell 310 has a periodicity of 320 ms (i.e., $T_{ProSe2}$=320 ms). In the example of FIG. 6, $N_{ProSe-freq}$=2 and $T_{ProSe\_ref}$=40 ms. Based on the rule according to Equation (1) above, the minimum value of periodicity for ProSe sidelink resources on any of the two carriers in the example of FIG. 6 is determined according to Equation (3) below:

$$T_{ProSe-new} \geq 40*2 \quad (3)$$

This means that the new minimum periodicity for ProSe is 80 ms ($T_{ProSe-new} \geq 80$) on each carrier. This is illustrated in Scenario (B) of FIG. 6.

The change in minimum periodicity is reflected in Scenario (B) of FIG. 6, and in particular in the placement of ProSe operations 605A-E. As illustrated by Scenario (B), the minimum periodicity of ProSe operation on PCell 305 (i.e., $T_{ProSe1}$) is extended from 40 ms to 80 ms per carrier. This enables the network node (e.g., network node 115 described above in relation to FIG. 2) to schedule WAN more often within this duration. For example, typically the ProSe Direct Discovery is used to broadcast data on a periodic basis. While modifying the periodicity of such information from 40 ms to 80 ms will not cause a big impact, it will enable stable WAN operation. Since the periodicity of ProSe operation on SCell 310 (i.e., $T_{ProSe2}$) is 320 ms (which is already larger than $T_{ProSe-new}$), $T_{ProSe2}$=320 ms can be configured on SCell 310.

Figure 7:
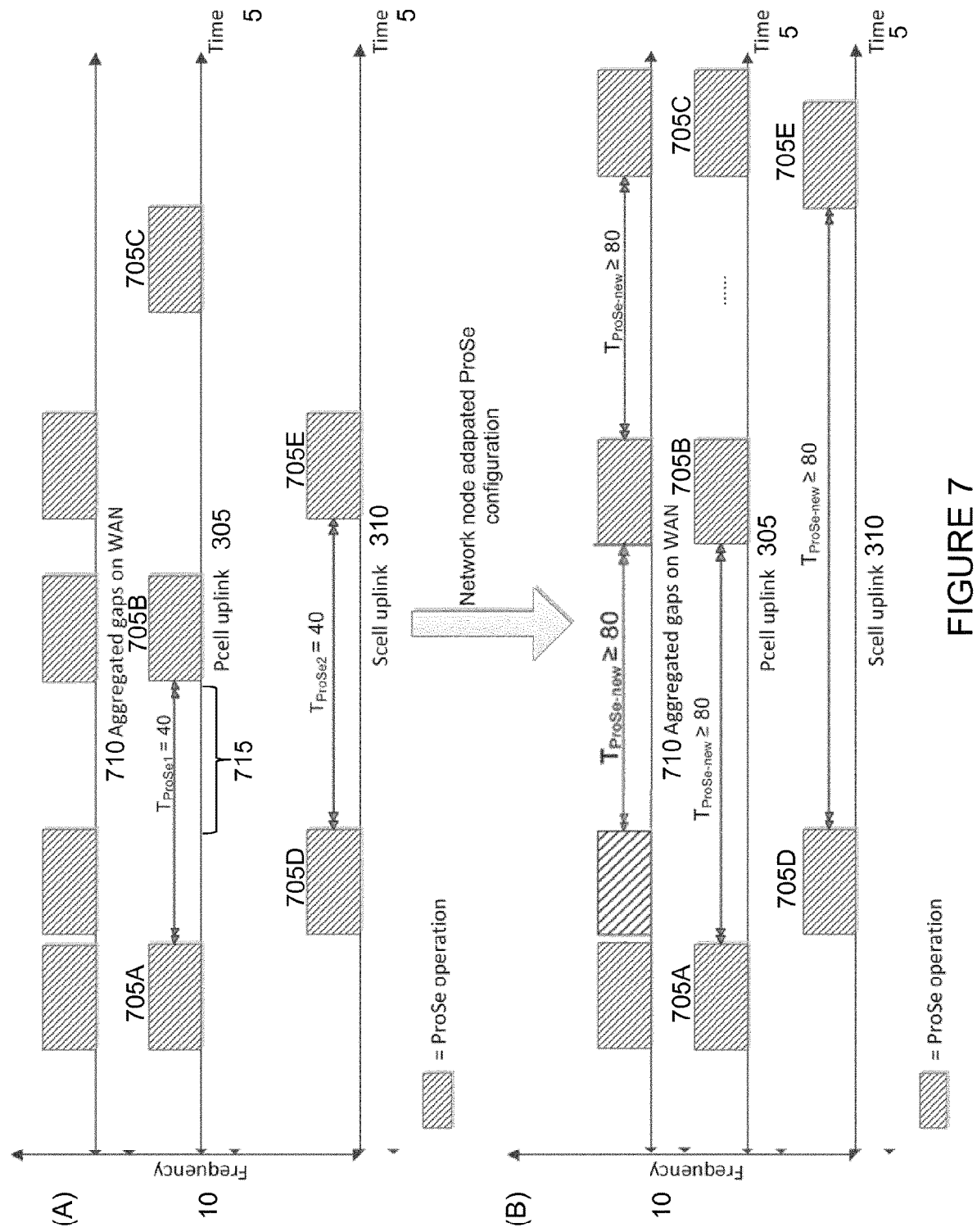
FIG. 7 illustrates an example adaptation of the ProSe periodicity of ProSe resources on sidelink on two carriers with the same periodicities, in accordance with certain embodiments.

FIG. 7 illustrates an example adaptation of the ProSe periodicity of ProSe resources on sidelink on two carriers with the same periodicities, in accordance with certain embodiments. In FIG. 7, time 5 is on the X-axis and frequency 10 is on the Y-axis. A number of instances of ProSe operation 705 are shown. Namely, instances of ProSe operation 705A-C are shown in the example of FIG. 7 on PCell 305, and instances of ProSe operation 705D-E are shown in the example of FIG. 7 on SCell 310. Similar to FIG. 6 described above, in FIG. 7 Scenario (A) illustrates ProSe operation before the configuration for ProSe operation of the UE on PCell 305 and SCell 310 is adapted so that an amount of interruptions to WAN operation of the UE is below an allowed interruption value. Scenario (B) illustrates ProSe operation after the configuration for ProSe operation of the UE on PCell 305 and SCell 310 has been adapted so that the amount of interruptions to WAN operation of UE 110B is below the allowed interruption value. In addition, the aggregated gaps 710 on WAN for each of Scenarios (A) and (B) is shown.

In Scenario (A) of the example of FIG. 7, assume that based on existing solutions the UE is configured with the same periodicity of ProSe operation on PCell 305 and SCell 310. In other words, $T_{ProSe1}$=40 ms, and $T_{ProSe2}$=40 ms). Assume further that $N_{ProSe-freq}$=2). In this case, the effective periodicity period 715 will become 20 ms as shown in Scenario (A) of FIG. 7. This means that the ProSe operation on the two carriers can take place subsequently (e.g., ProSe operation 705A on PCell 305 and ProSe operation 705D on SCell 310. This in turn will increase the aggregated interruption on WAN two times compared to the case if the effective periodicity of sidelink resources on two carriers is 40 ms.

According to the example embodiments of the method described herein (i.e., based on the rule according to Equation (1) above and also assuming $T_{ProSe\_ref}$=40 ms), the minimum value of periodicity for ProSe sidelink resources on any of the two carriers in this second example will be, according to Equation (2) described above, 80 ms. This is reflected in Scenario (B).

In Scenario (B), the minimum time between two ProSe occasions is set to 80 ms (i.e., $T_{ProSe-new} \geq 80$). This will enable fair resource sharing between WAN and ProSe. This in turn will ensure that the aggregated interruption on WAN due to ProSe operation on two carriers will not exceed, for example, 0.625% interruption probability.

The same principle on aligning the ProSe operation across the configured carriers can be used when the UE is configured with any number of serving cells and any number of carriers with ProSe operations. Note that the impact on WAN increases with the number of carriers configured for WAN as well as the number of carriers with ProSe operation. Therefore the method described herein for aligning the ProSe operation across the carriers becomes more important with an increased number of carriers.

Returning to FIG. 2, network node 115 may also take into account one or several additional parameters in determining the configuration for ProSe operation. For example, network node 115 may take into account one or more of the following parameters: a maximum interruption rate allowed on WAN caused by a certain carrier and/or all carriers; and a BLER target on a certain carrier and/or all carriers.

If there is no requirement on maximum interruption rate, or the requirement is very loose, then network node 115 may not use the method described herein. However, if UE 110B is restricted to maintain a certain interruption target and/or BLER target, then network node 115 may use the above described method to ensure that the performance of both WAN and ProSe can be maintained under the targets. For this purpose, network node 115 may in certain embodiments further compare the interruption rate and/or BLER target to pre-defined or pre-configured thresholds, and use this comparison to activate the method.

In certain embodiments, network node 115 may communicate the determined configuration for ProSe operation of UE 110B to at least one of another network node and one or more UEs 110 configured for ProSe operation. For example, in certain embodiments network node 115 may signal information related to ProSe operation over multiple carriers to other network nodes (and/or other nodes, such as a UE 110). In certain embodiments, a transmitting node may transmit or signal information to other nodes related to power levels of two or more types of reference signals used for measurement. Examples of other nodes that may receive the above-described information include a radio network node (e.g., eNodeB, base station, access point, etc.), ProSe UEs, ProSe relay UEs, IoT device, NB-IOT device, core network nodes, positioning node or any other node used for dedicated services such as self-organizing network (SON) node. The other nodes to which the determined information is communicated could also be under operator control or third party control. The other nodes may also be the receiving node.

There may be significant technical advantages to sharing the determined information with other nodes. For example, one potential advantage is that the same or partial information may be applicable to other nodes in network 100, and in that case it can be reused. This way, the ProSe operation over multiple carriers and/or cells can be further coordinated in order to further improve the WAN and ProSe performance. This way the potential gains can be achieved in large scale. As another example, a second potential advantage is that deriving the measurement configuration, which can be quite complex sometimes, can be done in one place and only once, and then signaled to other nodes in network 100. This way, processing in the different nodes in network 100 can be reduced.

As described above, in certain embodiments a method in a UE 110, such as UE 110B, for managing interruptions to WAN operation is disclosed. UE 110B may be a ProSe capable UE served by network node 115, and may provide ProSe over at least two carriers. According to one example embodiment, UE 110B configures ProSe radio resources on the at least two carriers such that an aggregated interruption to the WAN operation of the wireless device is below an allowed interruption value. In certain embodiments, UE 110B obtains a configuration for ProSe operation of UE 110B for the at least two carriers. The obtained configuration may include at least ProSe radio resources for performing ProSe operation on the at least two carriers, and configures ProSe radio resources on the at least two carriers based on the obtained configuration. In certain embodiments, UE 110B obtains a minimum value of periodicity with which to configure ProSe operation of UE 110B on the at least two carriers, and configures the ProSe radio resources on the at least two carriers based on the obtained minimum value of periodicity. The minimum value of periodicity may comprise a minimum periodicity for ProSe operation that enables the aggregated interruption to WAN operation of UE 110B to be below an allowed interruption value.

UE 110B may obtain the configuration for ProSe operation of UE 110B for the at least two carriers in any suitable manner. For example, in certain embodiments UE 110B obtains the configuration for ProSe operation (or information about the configuration for ProSe operation) from network node 115 as described above with respect to network node 115 communicating the adapted configuration. The obtained configuration for ProSe operation of UE 110B (or the information about the configuration for ProSe operation of UE 110B) may include the sidelink resource configuration as adapted by network node 115, for example in the manner described above.

UE 110B may obtain the minimum value of periodicity with which to configure ProSe operation of UE 110B on the at least two carriers in any suitable manner. For example, in certain embodiments UE 110B may obtain information about the minimum periodicity of ProSe sidelink resources (i.e., $T_{ProSe-new}$ and related parameters) in an analogous manner to that described above with respect to network node 115. UE 110B may obtain this information based on, for example, one or more pre-defined rules, based on an indication received from network node 115, or based on an indication received from another ProSe UE 110. A general rule can be specified as follows (i.e., the minimum periodicity of ProSe resources ($T_{PrSse-min}$) on each carrier for UE 110B) according to Equation (4):

$$T_{ProSe-min} = f(T_{ProSe\_ref}, N_{ProSe-freq}) \quad (4)$$

A specific example to determine $T_{ProSe}$-min is as follows according to Equation (5):

$$T_{ProSe-min} \geq T_{ProSe\_ref} * N_{ProSe-freq} \quad (5)$$

In certain embodiments, the following can be pre-defined as shown in Tables 1-3 below (assuming $T_{ProSe\_ref}=40$ ms). The new periodicity that is determined can be defined using the IE SL-DiscResourcePool for Discovery or IE SL-CommConfig for Communication.

TABLE 1

ProSe configuration with minimum ProSe periodicity
of sidelink resources on PCell and one SCell

| UE serving cells | Minimum ProSe periodicity ($T_{ProSe-new}$) expressed in ms. This can be defined using the IE SL-DiscResourcePool for Discovery or IE SL-CommConfig for Communication. | |
|---|---|---|
| | $T_{ProSe1}$ | $T_{ProSe2}$ |
| PCell | ≥80 | N/A |
| SCell | N/A | ≥80 |

TABLE 2

ProSe configuration with minimum ProSe periodicity
of sidelink resources on PCell and two SCells

| UE serving cells | Minimum ProSe periodicity ($T_{ProSe-new}$) expressed in ms. This can be defined using the IE SL-DiscResourcePool for Discovery or IE SL-CommConfig for Communication. | | |
|---|---|---|---|
| | $T_{ProSe1}$ | $T_{ProSe2}$ | $T_{ProSe3}$ |
| PCell | ≥120 | N/A | |
| SCell1 | N/A | ≥120 | |
| SCell2 | NA | NA | ≥120 |

TABLE 3

ProSe configuration with minimum ProSe periodicity
of SL resources on PCell and non-serving cell

| UE serving cells | Minimum ProSe periodicity ($T_{ProSe-new}$) expressed in ms. This can be defined using the IE SL-DiscResourcePool for Discovery or IE SL-CommConfig for Communication. | |
|---|---|---|
| | $T_{ProSe1}$ | $T_{ProSe2}$ |
| PCell | ≥80 | N/A |
| Non-serving cell | N/A | ≥80 |

In certain embodiments, UE 110B configures ProSe radio resources on the at least two carriers based on the obtained configuration and the obtained minimum value of periodicity with which to configure ProSe operation of UE 110B. For example, in certain embodiments UE 110B compares the obtained information (i.e., the obtained configuration for ProSe operation of UE 110B on the at least two cells belonging to different carriers and the obtained minimum value of periodicity with which to configure ProSe operation of UE 110B) and performs one of the following operations. If the obtained periodicity of sidelink resources for ProSe operation on each carrier is larger than or equal to the obtained minimum value of periodicity ($T_{ProSe-new}$), then UE 110B configures those sidelink resources on the indicated carriers for performing ProSe operation.

If the obtained periodicity of sidelink resources for ProSe operation on any carrier is less than the obtained minimum value of periodicity, then the UE performs one or more of the following operations. UE 110B may configure sidelink resources only on that indicated carrier for performing ProSe operation for which sidelink resource periodicity is equal to or larger than the minimum value (e.g., 80 ms). UE 110B may not configure sidelink resources on any indicated carrier for performing ProSe operation for which sidelink resource periodicity is less than the minimum value (e.g., 80 ms). UE 110B may adapt and then configure sidelink resources on any indicated carrier for performing ProSe operation for which sidelink resource periodicity is less than the minimum value (e.g., 80 ms). The adaptation herein means that UE 110B configures the sidelink resources with at least minimum periodicity ($T_{ProSe-new}$). In this case, UE 110B may also optionally inform network node 115 that UE 110B has configured the ProSe sidelink resources with the adapted value of ProSe sidelink periodicity ($T_{ProSe-new}$).

After configuring the ProSe sidelink resources, UE 110B may perform ProSe operation on the carriers and also perform WAN operation on one or more serving cells. Performing ProSe operation on the carriers using the configured ProSe sidelink resources may advantageously allow UE 110B to perform ProSe operation while not exceeding a maximum interruption probability in terms of missed ACK/NACK on WAN operation.

In certain embodiments, UE 110B may also obtain the allowed interruption value. For example, UE 110B may obtain a maximum allowed value of interruption probability on one or more serving cells due to ProSe operation on one or more carriers. In some cases, the allowed interruption value may be based on a number of missed HARQ ACK/NACK. UE 110B may adapt its receiver and/or transmitter configuration while performing ProSe to ensure that the aggregated value of interruption probability/rate on WAN operation does not exceed the obtained value (e.g., 0.625%).

Figure 8:
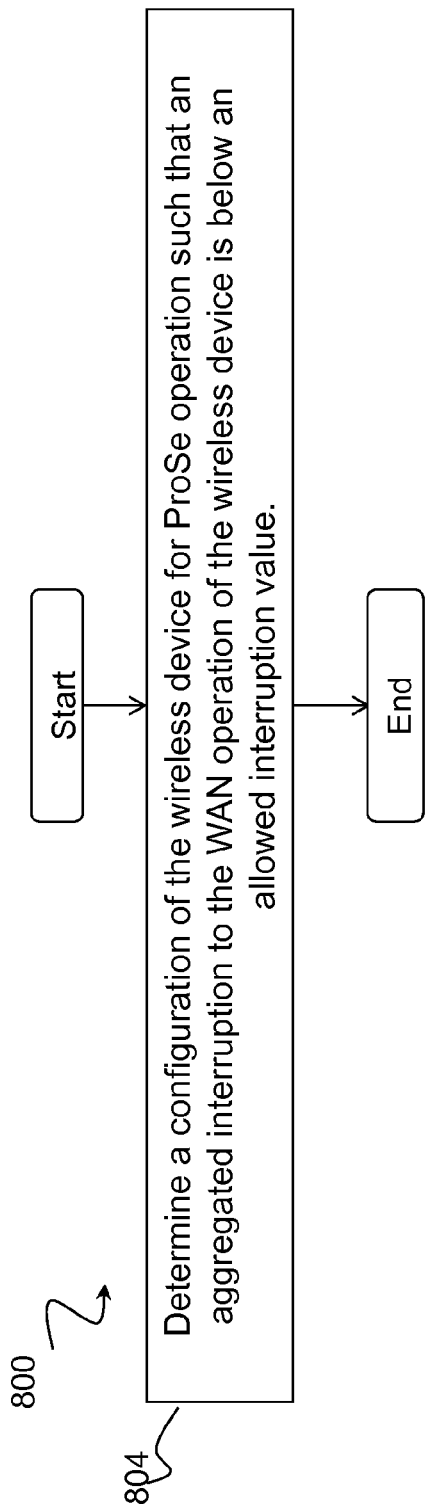
FIG. 8 is a flow diagram of a method in a network node, in accordance with certain embodiments.

FIG. 8 is a flow diagram of a method 800 in a network node. More particularly, FIG. 8 is a flow diagram of method 800 for managing interruptions to WAN operation of a wireless device, wherein the wireless device provides ProSe over at least two carriers. The method begins at step 804, where the network node determines a configuration of the wireless device for ProSe operation such that an aggregated interruption to the WAN operation of the wireless device is below an allowed interruption value.

In certain embodiments, the method may comprise determining the configuration of the wireless device based on a periodicity for ProSe operation of the wireless device on one or more of the at least two carriers configured for ProSe operation at the wireless device. In certain embodiments, the method may comprise determining whether gaps are configured or requested for ProSe operation on one or more of the at least two carriers, and determining the configuration of the wireless device based on whether gaps are determined to be configured or requested for ProSe operation on one or more of the at least two carriers.

In certain embodiments, determining the configuration may comprise adapting a ProSe periodicity of at least one of the at least two carriers configured for ProSe operation at the wireless device. The adapted ProSe periodicity of the at least one carrier may be a function of a total number of carriers configured for ProSe operation at the wireless device. The adapted ProSe periodicity of the at least one carrier may be a function of a reference value.

In certain embodiments, the method may comprise determining the configuration of the wireless device based on information about one or more of the at least two carriers configured for ProSe operation at the wireless device. The information about the one or more carriers configured for ProSe operation at the wireless device may comprise one or more of: a number of carriers configured for ProSe operation at the wireless device; a type of carrier configured for ProSe operation at the wireless device; a number of cells configured for ProSe operation at the wireless device; a type of cell configured for ProSe operation at the wireless device; an activation status of at least one of the at least two carriers configured for ProSe operation at the wireless device; a maximum interruption rate of at least one of the at least two carriers configured for ProSe operation at the wireless device; and a target block error rate of at least one of the at least two carriers configured for ProSe operation at the wireless device.

In certain embodiments, determining the configuration may comprise modifying a number of carriers configured for ProSe operation at the wireless device. Determining the configuration may comprise adapting a ProSe scheduling configuration for the wireless device. Determining the configuration may comprise adapting a WAN scheduling configuration for the wireless device.

In certain embodiments, the method may comprise communicating the determined configuration to at least one of: another network node; and one or more wireless devices configured for ProSe operation. In certain embodiments, the allowed interruption value may be based on a number of missed HARQ ACK/NACK. Any of the above features may be considered as steps of a method or a functionality of a network.

Figure 9:
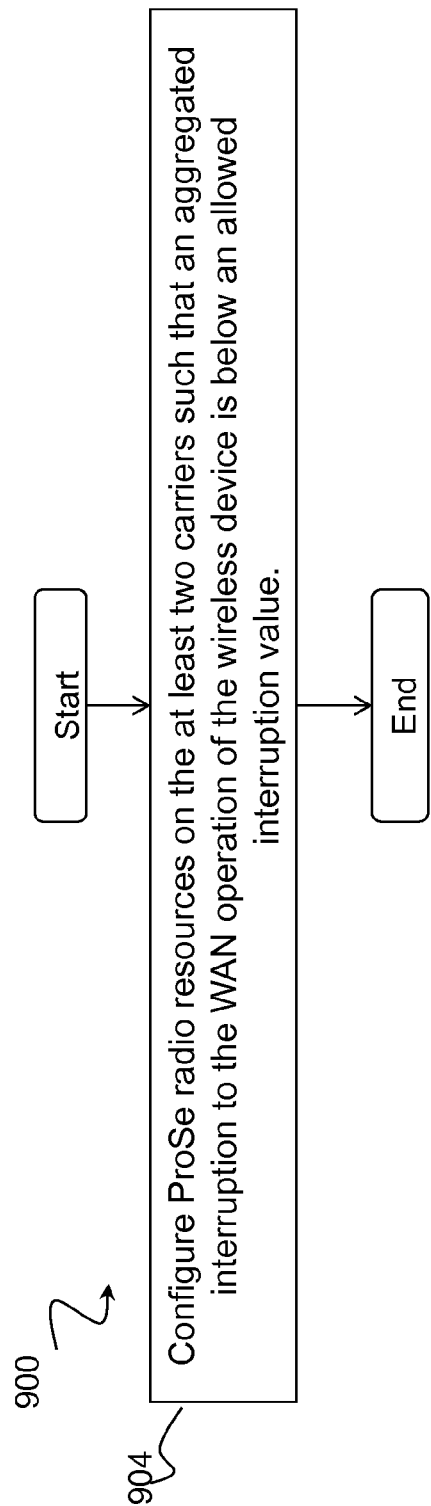
FIG. 9 is a flow diagram of a method in a wireless device, in accordance with certain embodiments.

FIG. 9 is a flow diagram of a method 900 in a wireless device, in accordance with certain embodiments. More particularly, FIG. 9 is a flow diagram of method 900 for managing interruptions to WAN operation of the wireless device, wherein the wireless device provides ProSe over at least two carriers. Method 900 includes step 904, where the wireless device configures ProSc radio resources on the at least two carriers such that an aggregated interruption to the WAN operation of the wireless device is below an allowed interruption value.

In certain embodiments, the method may comprise performing ProSe operation on the at least two carriers using the configured ProSe radio resources. In certain embodiments, the method may comprise obtaining the allowed interruption value. The allowed interruption value may be based on a number of missed HARQ ACK/NACK.

In certain embodiments, the method may comprise obtaining a configuration for ProSe operation of the wireless device for the at least two carriers, the obtained configuration comprising at least ProSe radio resources for performing ProSe operation on the at least two carriers, and the configuring ProSe radio resources on the at least two carriers may be based on the obtained configuration. Obtaining the configuration for ProSe operation of the wireless device may comprise receiving the configuration for ProSe operation of the wireless device from a network node.

In certain embodiments, the method may comprise obtaining a minimum value of periodicity with which to configure ProSe operation of the wireless device on the at least two carriers, the minimum value of periodicity comprising a minimum periodicity for ProSe operation that enables the aggregated interruption to the WAN operation of the wireless device to be below the allowed interruption value, and the configuring the ProSe radio resources on the at least two carriers may be based on the obtained minimum value of periodicity. The minimum value of periodicity with which to configure ProSe operation of the wireless device may be a function of a total number of carriers configured for ProSe operation at the wireless device. The minimum value of periodicity with which to configure ProSe operation of the wireless device may be a function of a reference value.

In certain embodiments, the method may comprise comparing the obtained configuration for ProSe operation of the wireless device and the obtained minimum value of periodicity with which to configure ProSe operation of the wireless device. The method may comprise configuring radio resources on at least one of the at least two carriers for performing ProSe operation if a periodicity of ProSe operation on a carrier in the obtained configuration is larger than or equal to the minimum value of periodicity. The method may comprise performing one or more of the following operations if a periodicity of ProSe operation on a carrier in the obtained configuration is less than the minimum value of periodicity: configuring radio resources only on one or more carriers having a periodicity of ProSe operation that is equal to or larger than the minimum value of periodicity; not configuring radio resources on a carrier that has a periodicity of ProSe operation that is less than the minimum value of periodicity; or configuring radio resources on a carrier that has a periodicity of ProSe operation that is less than the minimum value of periodicity after adapting the ProSe periodicity of the carrier to have at least the minimum periodicity. In certain embodiments, the method may comprise informing a network node that the wireless device has configured radio resources on the carrier with an adapted value of ProSe periodicity. Any of the above features may be considered as steps of a method or a functionality of a network.

Figure 10:
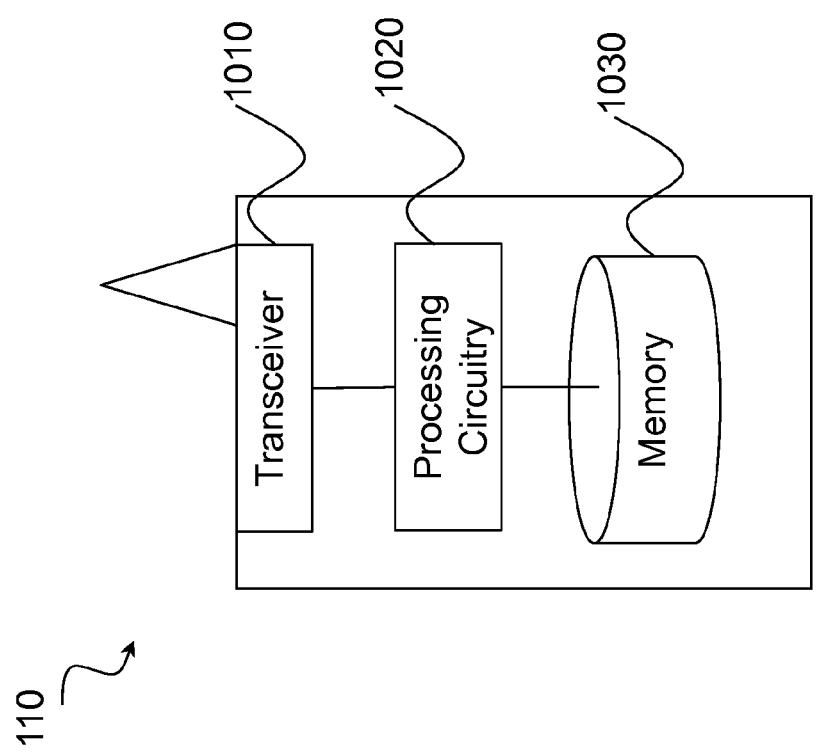
FIG. 10 is a block schematic of an exemplary wireless device, in accordance with certain embodiments.

FIG. 10 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1010, processing circuitry 1020, and memory 1030. In some embodiments, transceiver 1010 facilitates transmitting wireless signals to and receiving wireless signals from network node 115 (e.g., via an antenna), processing circuitry 1020 executes instructions to provide some or all of the functionality described above as being provided by wireless device 110, and memory 1030 stores the instructions executed by processing circuitry 1020.

Processing circuitry 1020 may include any suitable combination of hardware and software implemented in one or more modules to execute instructions and manipulate data to perform some or all of the described functions of wireless device 110, such as the functions of wireless device 110 described above in relation to FIGS. 1-9. In some embodiments, processing circuitry 1020 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1020.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 1020. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
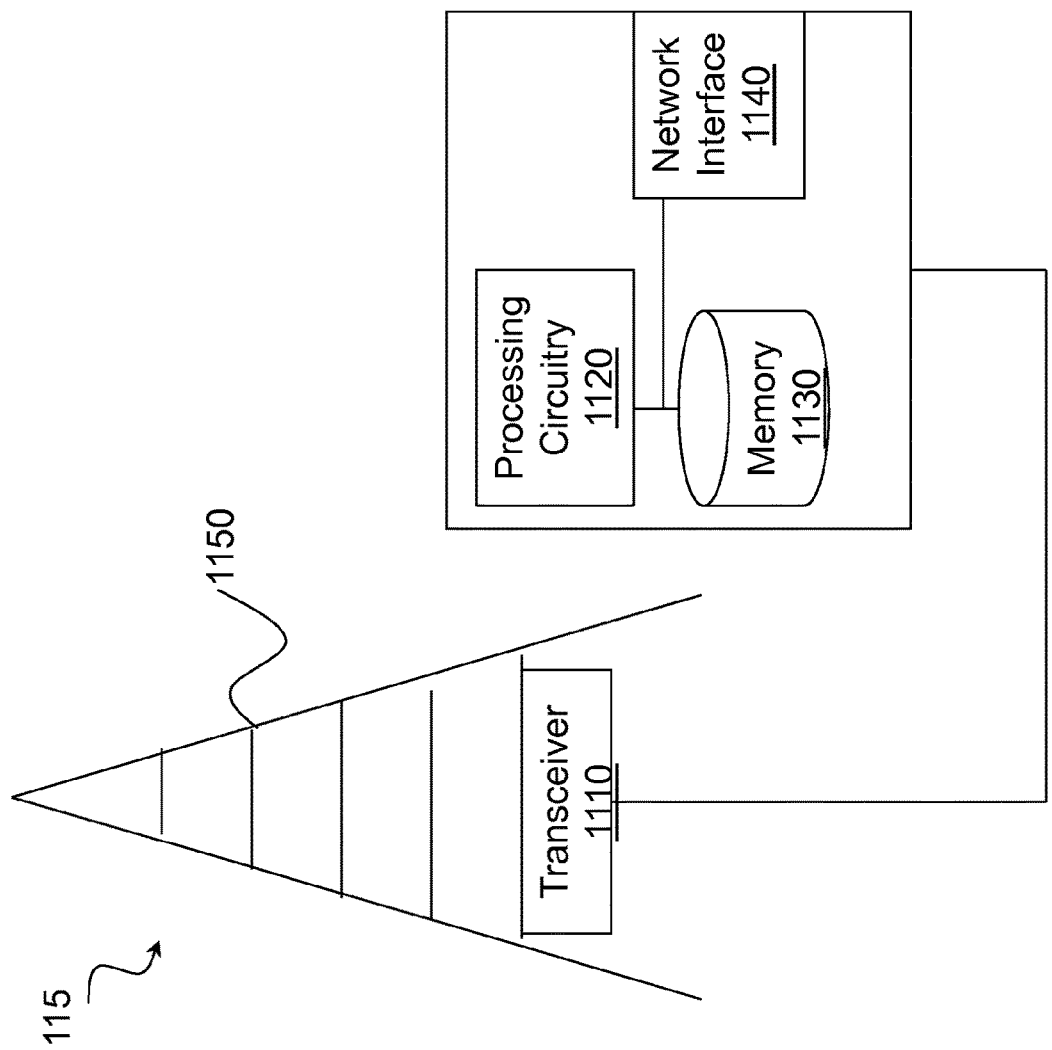
FIG. 11 is a block schematic of an exemplary network node, in accordance with certain embodiments.

FIG. 11 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1110, processing circuitry 1120, memory 1130, and network interface 1140. In some embodiments, transceiver 1110 facilitates transmitting wireless signals to and receiving wireless signals from wireless device 110 (e.g., via antenna 1150), processing circuitry 1120 executes instructions to provide some or all of the functionality described above as being provided by a network node 115, memory 1130 stores the instructions executed by processing circuitry 1120, and network interface 1140 communicates signals to backend network components, such as a gateway, switch, router, Internet, Public Switched Telephone Network (PSTN), core network nodes or radio network controllers 130, etc.

Processing circuitry 1120 may include any suitable combination of hardware and software implemented in one or more modules to execute instructions and manipulate data to perform some or all of the described functions of network node 115, such as those described above in relation to FIGS. 1-9. In some embodiments, processing circuitry 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for network node 115, send output from network node 115, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of network node 115 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
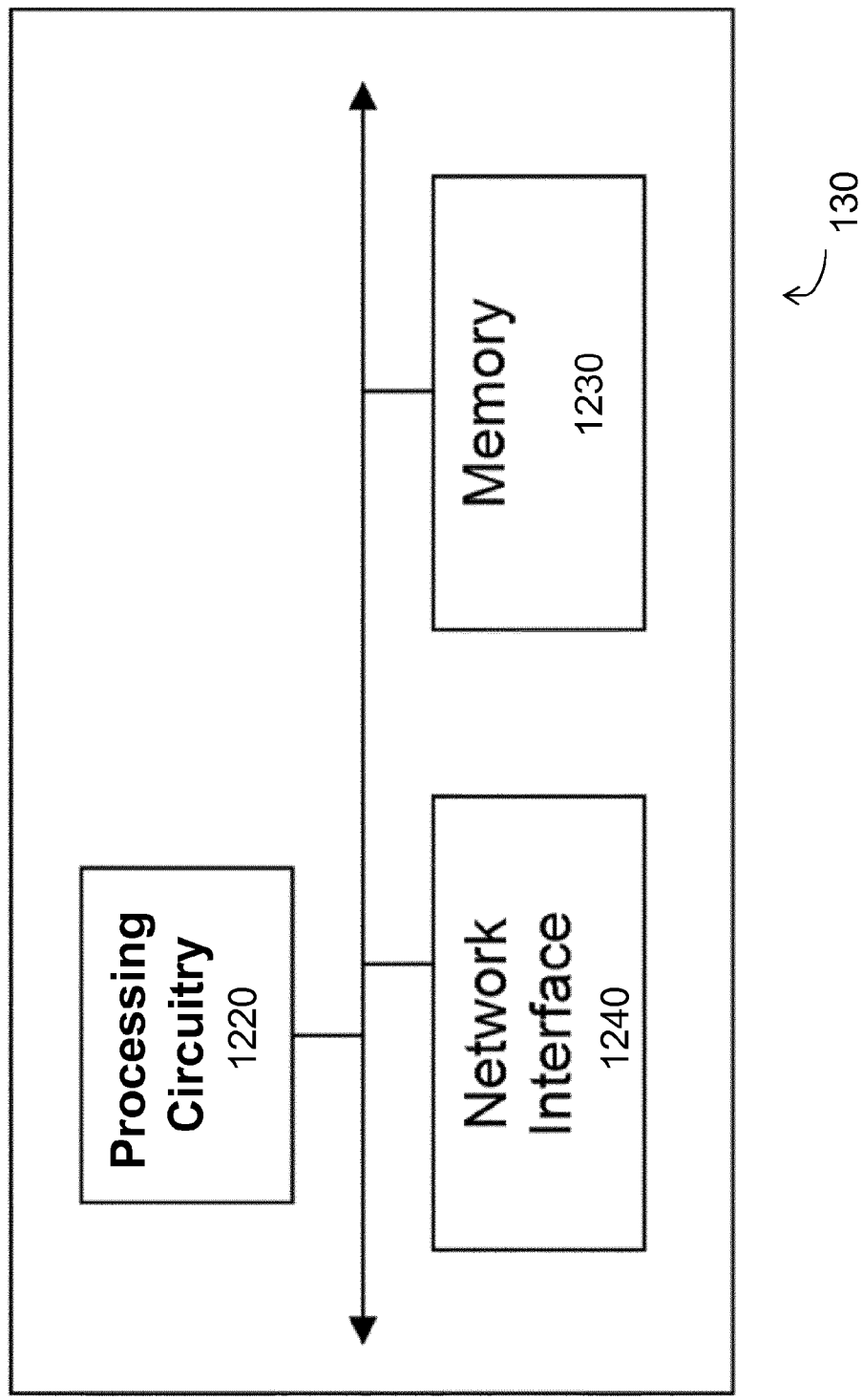
FIG. 12 is a block schematic of an exemplary radio network controller or core network node, in accordance with certain embodiments.

FIG. 12 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1220, memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, Public Switched Telephone Network (PSTN), network nodes 115, radio network controllers or core network nodes 130, etc.

Processing circuitry 1220 may include any suitable combination of hardware and software implemented in one or more modules to execute instructions and manipulate data to perform some or all of the described functions of the radio network controller or core network node 130. In some embodiments, processing circuitry 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by processing circuitry 1220. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Figure 13:
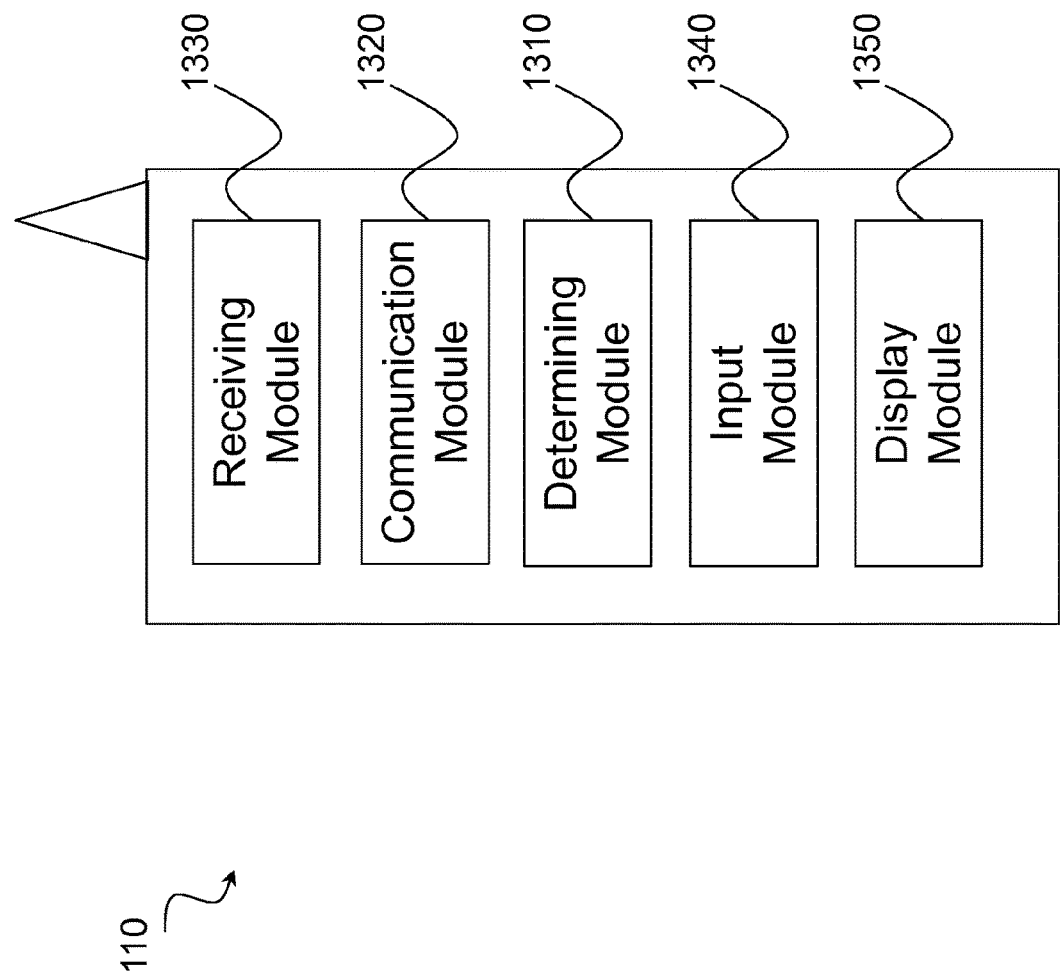
FIG. 13 is a block schematic of an exemplary wireless device, in accordance with certain embodiments.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

FIG. 13 is a schematic block diagram of an exemplary wireless device, in accordance with certain embodiments. Wireless device 110 may include one or more modules. For example, wireless device 110 may include a determining module 1310, a communication module 1320, a receiving module 1330, an input module 1340, a display module 1350, and any other suitable modules. In some embodiments, one or more of determining module 1310, communication module 1320, receiving module 1330, input module 1340, display module 1350, or any other suitable module may be implemented using one or more processors, such as processing circuitry 1020 described above in relation to FIG. 10. In certain embodiments, the functions of two or more of the various modules may be combined into a single module. Wireless device 110 may perform the methods for limiting interruption in multicarrier ProSe operation described above with respect to FIGS. 1-9.

Determining module 1310 may perform the processing functions of wireless device 110. As one example, determining module 1310 may configure ProSe radio resources on the at least two carriers such that an aggregated interruption to the WAN operation of the wireless device is below an allowed interruption value. As another example, determining module 1310 may obtain a configuration for ProSe operation of the wireless device for the at least two carriers, the obtained configuration comprising at least ProSe radio resources for performing ProSe operation on the at least two carriers, and configure ProSe radio resources on the at least two carriers based on the obtained configuration. As another example, determining module 1310 may obtain a minimum value of periodicity with which to configure ProSe operation of the wireless device on the at least two carriers, the minimum value of periodicity comprising a minimum periodicity for ProSe operation that enables the aggregated interruption to the WAN operation of the wireless device to be below the allowed interruption value, and configure the ProSe radio resources on the at least two carriers based on the obtained minimum value of periodicity. As still another example, determining module 1310 may perform ProSe operation on the at least two carriers using the configured ProSe radio resources. As yet another example, determining module 1310 may compare the obtained configuration for ProSe operation of the wireless device and the obtained minimum value of periodicity with which to configure ProSe operation of the wireless device. Determining module 1310 may configure radio resources on at least one of the at least two carriers for performing ProSe operation if a periodicity of ProSe operation on a carrier in the obtained configuration is larger than or equal to the minimum value of periodicity. Determining module 1310 may perform one or more of the following operations if a periodicity of ProSe operation on a carrier in the obtained configuration is less than the minimum value of periodicity: configure radio resources only on one or more carriers having a periodicity of ProSe operation that is equal to or larger than the minimum value of periodicity; not configure radio resources on a carrier that has a periodicity of ProSe operation that is less than the minimum value of periodicity; or configure radio resources on a carrier that has a periodicity of ProSe operation that is less than the minimum value of periodicity after adapting the ProSe periodicity of the carrier to have at least the minimum periodicity. As another example, determining module 1310 may obtain the allowed interruption value.

Determining module 1310 may include or be included in one or more processors, such as processing circuitry 1020 described above in relation to FIG. 10. Determining module 1310 may include analog and/or digital circuitry configured to perform any of the functions of determining module 1310 and/or processing circuitry 1020 described above. The functions of determining module 1310 described above may, in certain embodiments, be performed in one or more distinct modules.

Communication module 1320 may perform the transmission functions of wireless device 110. As one example, communication module 1330 may inform a network node that the wireless device has configured radio resources on the carrier with an adapted value of ProSe periodicity. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310. In certain embodiments, the functions of communication module 1320 described above may be performed in one or more distinct modules.

Receiving module 1330 may perform the receiving functions of wireless device 110. For example, receiving module 1330 may obtain a configuration for ProSe operation of the wireless device for the at least two carriers, the obtained configuration comprising at least ProSe radio resources for performing ProSe operation on the at least two carriers. As another example, receiving module 1330 may obtain a minimum value of periodicity with which to configure ProSe operation of the wireless device on the at least two carriers, the minimum value of periodicity comprising a minimum periodicity for ProSe operation that enables the aggregated interruption to the WAN operation of the wireless device to be below the allowed interruption value. As still another example, receiving module 1330 may receive the configuration for ProSe operation of the wireless device from a network node. As yet another example, receiving module 1330 may obtain the allowed interruption value.

Receiving module 1330 may include a receiver and/or a transceiver. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310. The functions of receiving module 1330 described above may, in certain embodiments, be performed in one or more distinct modules.

Input module 1340 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1310. The functions of input module 1340 described above may, in certain embodiments, be performed in one or more distinct modules.

Display module 1350 may present signals on a display of wireless device 110. Display module 1350 may include the display and/or any appropriate circuitry and hardware configured to present signals on the display. Display module 1350 may receive signals to present on the display from determining module 1310. The functions of display module 1350 described above may, in certain embodiments, be performed in one or more distinct modules.

Determining module 1310, communication module 1320, receiving module 1330, input module 1340, and display module 1350 may include any suitable configuration of hardware and/or software. Wireless device 110 may include additional modules beyond those shown in FIG. 13 that may be responsible for providing any suitable functionality, including any of the functionality described above and/or any additional functionality (including any functionality necessary to support the various solutions described herein).

Figure 14:
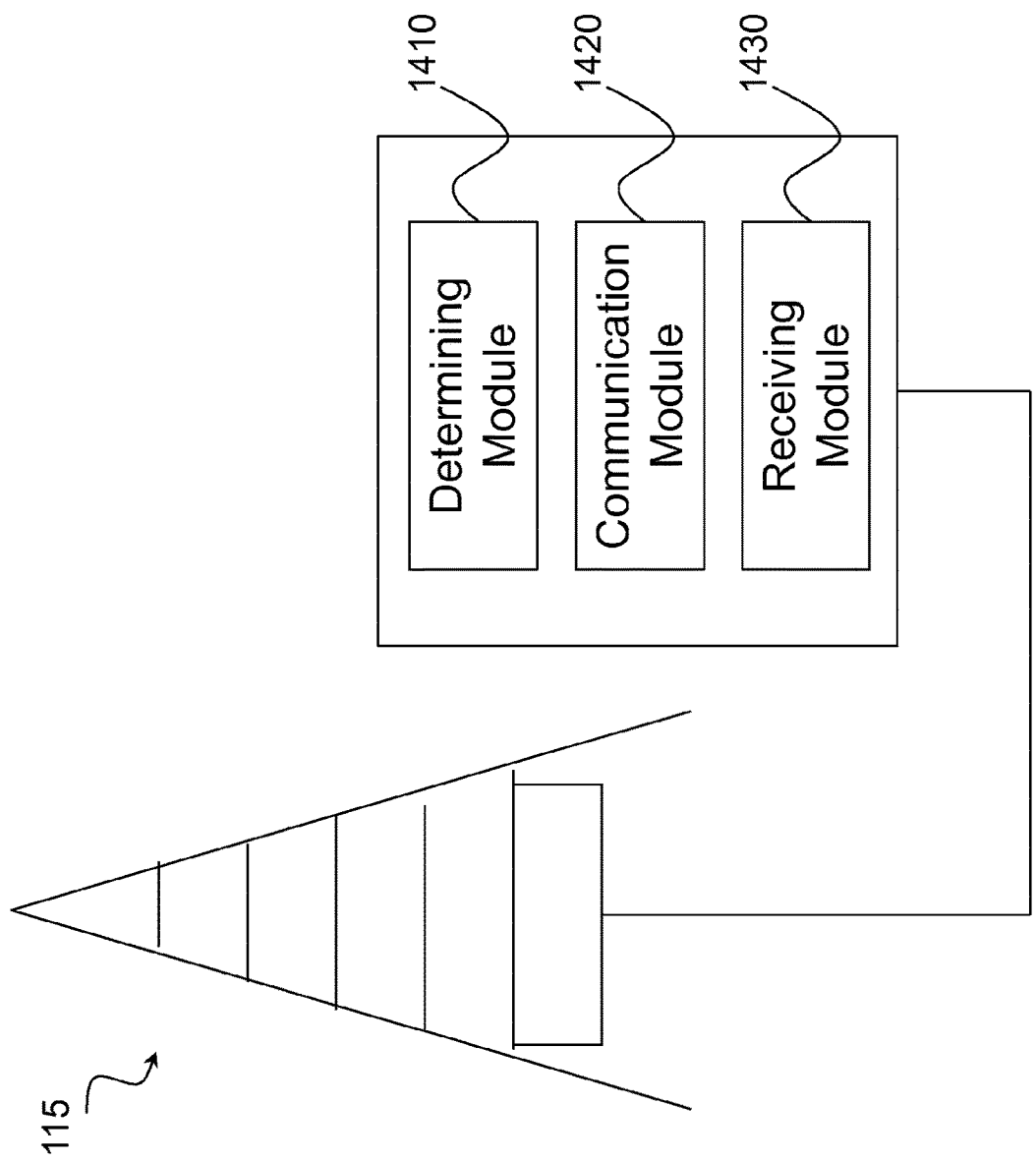
FIG. 14 is a block schematic of an exemplary network node, in accordance with certain embodiments.

FIG. 14 is a schematic block diagram of an exemplary network node 115, in accordance with certain embodiments. Network node 115 may include one or more modules. For example, network node 115 may include determining module 1410, communication module 1420, receiving module 1430, and any other suitable modules. In some embodiments, one or more of determining module 1410, communication module 1420, receiving module 1430, or any other suitable module may be implemented using one or more processors, such as processing circuitry 1120 described above in relation to FIG. 11. In certain embodiments, the functions of two or more of the various modules may be combined into a single module. Network node 115 may perform the methods for limiting interruption in multicarrier ProSe operation described above with respect to FIGS. 1-9.

Determining module 1410 may perform the processing functions of network node 115. As an example, determining module 1410 may determine a configuration of the wireless device for ProSe operation such that an aggregated interruption to the WAN operation of the wireless device is below an allowed interruption value. As another example, determining module 1410 may determine the configuration of the wireless device based on a periodicity for ProSe operation of the wireless device on one or more of the at least two carriers configured for ProSe operation at the wireless device. As another example, determining module 1410 may determine the configuration of the wireless device based on information about one or more of the at least two carriers configured for ProSe operation at the wireless device. As still another example, determining module 1410 may determine whether gaps are configured or requested for ProSe operation on one or more of the at least two carriers, and determine the configuration of the wireless device based on whether gaps are determined to be configured or requested for ProSe operation on one or more of the at least two carriers. As yet another example, determining module 1410 may adapt a ProSe periodicity of at least one of the at least two carriers configured for ProSe operation at the wireless device. As additional examples, in determining the configuration determining module 1410 may perform one or more of: modify a number of carriers configured for ProSe operation at the wireless device; adapt a ProSe scheduling configuration for the wireless device; and adapt a WAN scheduling configuration for the wireless device. As still another example, determining module 1410 may obtain a periodicity for ProSe operation of a wireless device, the wireless device served by the network node. As another example, determining module 1410 may obtain information about one or more carriers configured for ProSe operation at the wireless device. As still another example, determining module 1410 may adapt a configuration for ProSe operation of the wireless device on the one or more carriers so that an amount of interruptions to WAN operation of the wireless device is below an allowed interruption value, the configuration adapted based on the obtained periodicity for ProSe operation of the wireless device and the obtained information about the one or more carriers configured for ProSe operation at the wireless device.

Determining module 1410 may include or be included in one or more processors, such as processing circuitry 1120 described above in relation to FIG. 11. Determining module 1410 may include analog and/or digital circuitry configured to perform any of the functions of determining module 1410 and/or processing circuitry 1120 described above. The functions of determining module 1410 may, in certain embodiments, be performed in one or more distinct modules.

Communication module 1420 may perform the transmission functions of network node 115. As one example, communication module 1420 may communicate the determined configuration to at least one of: another network node; and one or more wireless devices configured for ProSe operation. Communication module 1420 may transmit messages to one or more of wireless devices 110. Communication module 1420 may include a transmitter and/or a transceiver, such as transceiver 1110 described above in relation to FIG. 11. Communication module 1420 may include circuitry configured to wirelessly transmit messages and/or signals. In particular embodiments, communication module 1420 may receive messages and/or signals for transmission from determining module 1410 or any other module. The functions of communication module 1420 may, in certain embodiments, be performed in one or more distinct modules.

Receiving module 1430 may perform the receiving functions of network node 115. As one example, receiving module 1430 may obtain a periodicity for ProSe operation of a wireless device, the wireless device served by the network node. As another example, receiving module 1430 may obtain information about one or more carriers configured for ProSe operation at the wireless device. Receiving module 1430 may receive any suitable information from a wireless device. Receiving module 1430 may include a receiver and/or a transceiver, such as transceiver 1110 described above in relation to FIG. 11. Receiving module 1430 may include circuitry configured to wirelessly receive messages and/or signals. In particular embodiments, receiving module 1430 may communicate received messages and/or signals to determining module 1410 or any other suitable module. The functions of receiving module 1430 may, in certain embodiments, be performed in one or more distinct modules.

Determining module 1410, communication module 1420, and receiving module 1430 may include any suitable configuration of hardware and/or software. Network node 115 may include additional modules beyond those shown in FIG.

14 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AP Access point
BCH Broadcast channel
BLER Block error rate
BS Base station
BSC Base station controller
BTS Base transceiver station
CA Carrier aggregation
CC Component carrier
D2D Device-to-Device
DAS Distributed antenna system
DC Dual Connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
LTE Long Term Evolution
M2M Machine-to-machine
MAC Media access control
MCG Master cell group
MDT Minimization of drive tests
MeNB Master eNode B
MIB Master Information Block
MME Mobility management entity
MRTD Maximum receive timing difference
MSR Multi-standard radio
MTC Machine-type-communication
NACK Negative Acknowledgement
OFDM Orthogonal frequency division multiplexing
SI System Information
SIB System Information Block
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
ProSe Proximity Service
PSCell Primary SCell
PSC Primary serving cell
PSS Primary synchronization signal
PSSS Primary Sidelink Synchronization Signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
SA Scheduling Assignment
SCC Secondary component carrier
SCell Secondary Cell
SCG Secondary Cell Group
SeNB Secondary eNode B
SIB System Information Block
SINR Signal to interference and noise ratio
SON Self-organizing networks
SSC Secondary serving cell
SSS Secondary synchronization signal
SSSS Secondary Sidelink Synchronization Signal
TDD Time division duplex
Tx Transmitter
UARFCN UMTS Absolute Radio Frequency Channel Number
UE User equipment
UL Uplink
V2X Vehicle-to-X
V2I Vehicle-to-Infrastructure
V2P Vehicle-to-Pedestrian
WAN Wide Area Network

The invention claimed is:

1. A method in a network node for managing interruptions to Wide Area Network, WAN, operation of a wireless device, wherein the wireless device provides Proximity Services, ProSe, over at least two carriers, the method comprising:
   determining a configuration of the wireless device for ProSe operation such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

2. The method of claim 1, comprising:
   determining the configuration of the wireless device based on a periodicity for ProSe operation of the wireless device on one or more of the at least two carriers configured for ProSe operation at the wireless device.

3. The method of claim 1, comprising:
determining whether gaps are configured or requested for ProSe operation on one or more of the at least two carriers; and
wherein the method comprises determining the configuration of the wireless device based on whether gaps are determined to be configured or requested for ProSe operation on one or more of the at least two carriers.

4. The method of claim 1, wherein determining the configuration comprises:
adapting a ProSe periodicity of at least one of the at least two carriers configured for ProSe operation at the wireless device.

5. The method of claim 4, wherein the adapted ProSe periodicity of the at least one carrier is a function of a total number of carriers configured for ProSe operation at the wireless device.

6. The method of claim 4, wherein the adapted ProSe periodicity of the at least one carrier is a function of a reference value.

7. The method of claim 1, comprising:
determining the configuration of the wireless device based on information about one or more of the at least two carriers configured for ProSe operation at the wireless device.

8. The method of claim 7, wherein the information about one or more carriers configured for ProSe operation at the wireless device comprises one or more of:
a number of carriers configured for ProSe operation at the wireless device;
a type of carrier configured for ProSe operation at the wireless device;
a number of cells configured for ProSe operation at the wireless device;
a type of cell configured for ProSe operation at the wireless device;
an activation status of at least one of the at least two carriers configured for ProSe operation at the wireless device;
a maximum interruption rate of at least one of the at least two carriers configured for ProSe operation at the wireless device; and
a target block error rate of at least one of the at least two carriers configured for ProSe operation at the wireless device.

9. The method of claim 1, wherein the allowed interruption value is based on a number of missed Hybrid Automatic Repeat Request (HARQ) Acknowledgement (ACK)/Negative Acknowledgement (NACK).

10. The method of claim 1, wherein determining the configuration comprises modifying a number of carriers configured for ProSe operation at the wireless device.

11. The method of claim 1, wherein determining the configuration comprises adapting a ProSe scheduling configuration for the wireless device.

12. The method of claim 1, wherein determining the configuration comprises adapting a WAN scheduling configuration for the wireless device.

13. The method of claim 1, comprising communicating the determined configuration to at least one of:
another network node; and
one or more wireless devices configured for ProSe operation.

14. A method in a wireless device for managing interruptions to Wide Area Network, WAN, operation of the wireless device, wherein the wireless device provides Proximity Services, ProSe, over at least two carriers, the method comprising:
configuring ProSe radio resources on the at least two carriers such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

15. The method of claim 14, comprising:
obtaining a configuration for ProSe operation of the wireless device for the at least two carriers, the obtained configuration comprising at least ProSe radio resources for performing ProSe operation on the at least two carriers; and
wherein the configuring ProSe radio resources on the at least two carriers is based on the obtained configuration.

16. The method of claim 15, wherein obtaining the configuration for ProSe operation of the wireless device comprises:
receiving the configuration for ProSe operation of the wireless device from a network node.

17. The method of claim 15, comprising comparing the obtained configuration for ProSe operation of the wireless device and the obtained minimum value of periodicity with which to configure ProSe operation of the wireless device.

18. The method of claim 15, comprising:
configuring radio resources on at least one of the at least two carriers for performing ProSe operation if a periodicity of ProSe operation on a carrier in the obtained configuration is larger than or equal to the minimum value of periodicity.

19. The method of claim 15, comprising informing a network node that the wireless device has configured radio resources on the carrier with an adapted value of ProSe periodicity.

20. The method of claim 14, comprising:
obtaining a minimum value of periodicity with which to configure ProSe operation of the wireless device on the at least two carriers, the minimum value of periodicity comprising a minimum periodicity for ProSe operation that enables the aggregated interruption to the WAN operation of the wireless device to be below the allowed interruption value; and
wherein the configuring the ProSe radio resources on the at least two carriers is based on the obtained minimum value of periodicity.

21. The method of claim 20, wherein the minimum value of periodicity with which to configure ProSe operation of the wireless device is a function of a total number of carriers configured for ProSe operation at the wireless device.

22. The method of claim 20, wherein the minimum value of periodicity with which to configure ProSe operation of the wireless device is a function of a reference value.

23. The method of claim 14, comprising performing one or more of the following operations if a periodicity of ProSe operation on a carrier is less than the minimum value of periodicity:
configuring radio resources only on one or more carriers having a periodicity of ProSe operation that is equal to or larger than a/the minimum value of periodicity;
not configuring radio resources on a carrier that has a periodicity of ProSe operation that is less than the minimum value of periodicity; or configuring radio resources on a carrier that has a periodicity of ProSe operation that is less than the minimum value of periodicity after adapting the ProSe periodicity of the carrier to have at least the minimum periodicity.

24. The method of claim 14, comprising performing ProSe operation on the at least two carriers using the configured ProSe radio resources.

25. The method of claim 14, comprising obtaining the allowed interruption value.

26. The method of claim 14, wherein the allowed interruption value is based on a number of missed Hybrid Automatic Repeat Request (HARQ) Acknowledgement (ACK)/Negative Acknowledgement (NACK).

27. A network node for managing interruptions to Wide Area Network, WAN, operation of a wireless device, wherein the wireless device provides Proximity Services, ProSe, over at least two carriers, the network node comprising:
  a receiver;
  a transmitter;
  memory; and
  processing circuitry communicatively coupled to the receiver, the transmitter, and the memory, the processing circuitry configured to:
  determine a configuration of the wireless device for ProSe operation such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

28. A wireless device for managing interruptions to Wide Area Network, WAN, operation of the wireless device, wherein the wireless device provides Proximity Services, ProSe, over at least two carriers, the wireless device comprising:
  a receiver;
  a transmitter;
  memory; and
  processing circuitry communicatively coupled to the receiver, the transmitter, and the memory, the processing circuitry configured to:
  configure ProSe radio resources on the at least two carriers such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

29. A non-transitory computer readable memory device storing a computer program comprising program instructions that, when executed on a network node configured to operate in a Wide Area Network, WAN, cause the processing circuitry to:
  determine a configuration of the wireless device for ProSe operation such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

30. A non-transitory computer readable memory device storing a computer program for managing interruptions to Wide Area Network, WAN, operation of the wireless device, wherein the wireless device provides Proximity Services, ProSe, over at least two carriers, the computer program comprising program instructions that, when executed on a wireless device configured to provide Proximity Services, ProSe, cause the processing circuitry to:
  configure ProSe radio resources on the at least two carriers such that an aggregated interruption to the WAN operation of the wireless device due to ProSe operations on the at least two carriers is below an allowed interruption value, wherein the aggregated interruption to the WAN operation of the wireless device comprises a total of interruptions to WAN operation on the at least two carriers.

* * * * *